United States Patent
Fenton

(10) Patent No.: US 7,296,821 B2
(45) Date of Patent: Nov. 20, 2007

(54) EQUALIZER FOR A SUSPENSION SYSTEM

(75) Inventor: E. Dale Fenton, Columbia, MO (US)

(73) Assignee: Lippert Components Manufacturing, Inc., Goshen, IN (US)

( * ) Notice: Subject to any disclaimer, the term of this patent is extended or adjusted under 35 U.S.C. 154(b) by 269 days.

(21) Appl. No.: 11/208,963

(22) Filed: Aug. 22, 2005

(65) Prior Publication Data

US 2007/0040346 A1    Feb. 22, 2007

(51) Int. Cl.
*B60G 5/00* (2006.01)
*B60G 11/04* (2006.01)
*B60G 5/053* (2006.01)

(52) U.S. Cl. .................... 280/680; 280/682; 280/686
(58) Field of Classification Search ............... 280/680, 280/682, 686, 124.127, 124.175; 267/229, 267/260, 266, 271, 47
See application file for complete search history.

(56) References Cited

U.S. PATENT DOCUMENTS

| | | | |
|---|---|---|---|
| 380,548 A * | 4/1888 | Broadhurst | 267/229 |
| 2,170,454 A | 8/1939 | Larison | |
| 2,719,728 A * | 10/1955 | Boyles | 280/682 |
| 2,811,213 A | 10/1957 | Miller | |
| 2,957,058 A * | 10/1960 | Trott | 200/61.22 |
| 3,003,781 A | 10/1961 | Black | |
| 3,178,201 A * | 4/1965 | Richnow, Jr. | 280/682 |
| 3,195,916 A * | 7/1965 | Cain | 280/682 |
| 3,410,572 A * | 11/1968 | Poulos | 280/682 |
| 3,499,660 A * | 3/1970 | Raidel | 280/682 |
| 3,767,222 A * | 10/1973 | Willetts | 280/682 |
| 3,799,562 A * | 3/1974 | Hinchliff | 280/682 |
| 3,856,325 A | 12/1974 | Willetts | |
| 4,033,606 A * | 7/1977 | Ward et al. | 280/682 |
| 4,195,863 A * | 4/1980 | Richardson | 280/86.751 |
| 4,270,765 A * | 6/1981 | Legueu | 280/686 |
| 4,371,189 A * | 2/1983 | Raidel | 280/682 |
| 4,502,707 A * | 3/1985 | Jable et al. | 280/682 |
| 4,504,079 A | 3/1985 | Strong | |
| 4,570,971 A | 2/1986 | Perlini | |
| 4,676,523 A | 6/1987 | Rogers | |

(Continued)

OTHER PUBLICATIONS

Printout from www.truckspring.com website detailing Timbren Ride Control; Two (2) pages; Jun. 3, 2002.

(Continued)

*Primary Examiner*—Eric Culbreth
*Assistant Examiner*—Joseph Rocca
(74) *Attorney, Agent, or Firm*—Barnes & Thornburg, LLP

(57) ABSTRACT

An equalizer for a suspension system for a trailer is configured to absorb or dampen the harsh shocks or vibrations coming off of the leaf springs proximate to a center frame hangar, thus allowing for a "softer" ride. The equalizer utilizes two independent equalizer arm assemblies which are each rotatably secured within the equalizer. Each equalizer arm assembly is operatively associated with one of the front or rear leaf springs such that upon upward movement of either the front or rear leaf spring, the associated equalizer arm assembly is forced to rotate within the equalizer and to deform a shock absorber provided within the equalizer. The shock absorber, upon the deformation thereof, absorbs the harsh shocks or vibrations which would otherwise normally be transferred from the leaf springs, to the equalizer, and thus to the frame of the trailer.

28 Claims, 14 Drawing Sheets

U.S. PATENT DOCUMENTS

| | | | | |
|---|---|---|---|---|
| 5,234,067 | A | * | 8/1993 | Simard .................... 180/24.01 |
| 5,486,807 | A | * | 1/1996 | Price ......................... 340/443 |
| 5,662,314 | A | * | 9/1997 | Stoltzfus .................... 267/271 |
| 5,697,172 | A | | 12/1997 | Verseef |
| 5,951,032 | A | | 9/1999 | Overby et al. |
| 6,015,158 | A | | 1/2000 | Overby et al. |
| 6,092,819 | A | | 7/2000 | Overby et al. |
| 6,220,585 | B1 | | 4/2001 | Heron |
| 6,478,321 | B1 | | 11/2002 | Heitzmann |
| 7,144,031 | B2 | * | 12/2006 | Fenton ....................... 280/682 |

OTHER PUBLICATIONS

Printout of MOR/ryde Rubber Equalizer Suspension System Installation Instructions; Six (6) pages.

Printout of Dexter Axle's Hagner and Ataching Parts Kits; Two (2) pages.

Printout from www.al-kousa.com website detailing leaf spring axles; One (1) page.

Printout of the Hutch 9700 Trailer Suspension Series; Four (4) pages.

Printout of the Holland Group's Mechanical Suspension Series; Two (2) pages.

Printout from www.transport.tuthull.com website detailing Four Spring Van Slider Sluspension; One (1) page.

Printout from www. trailair.com detailing center point suspension; Three (3); 2002.

* cited by examiner

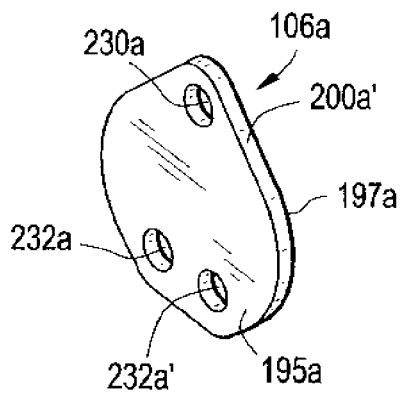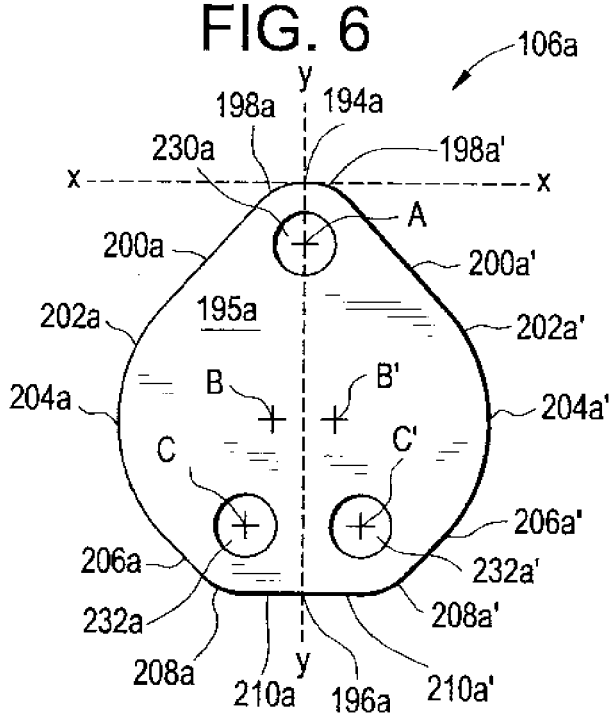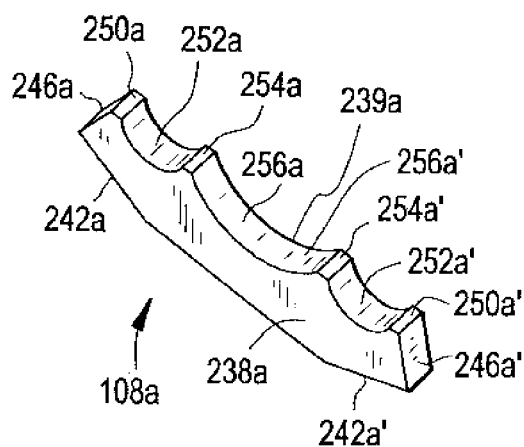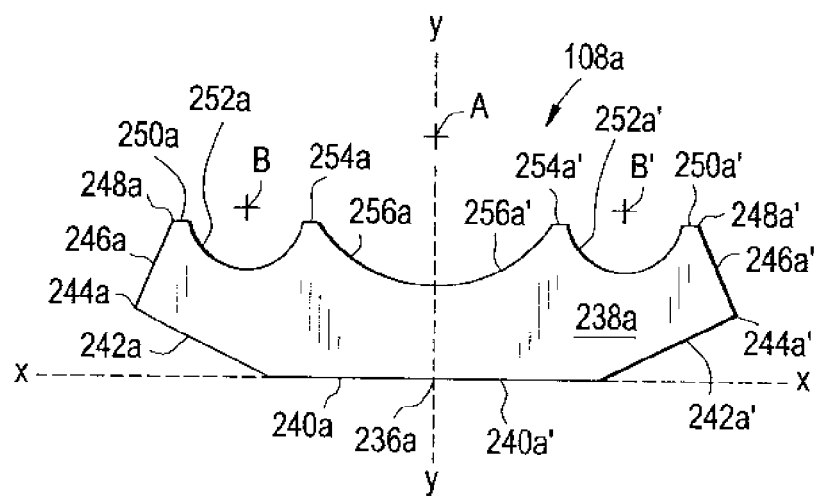

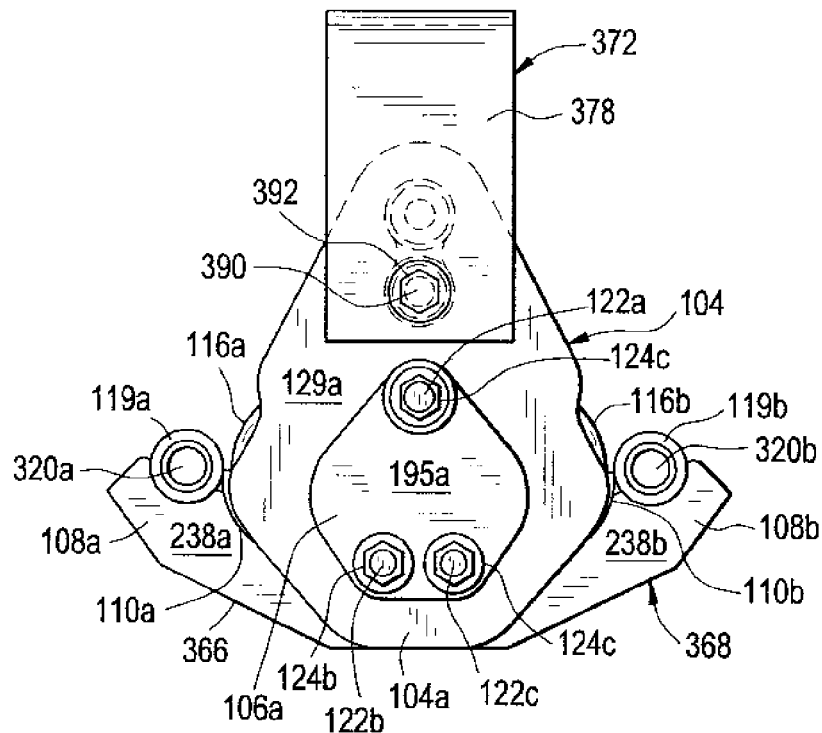
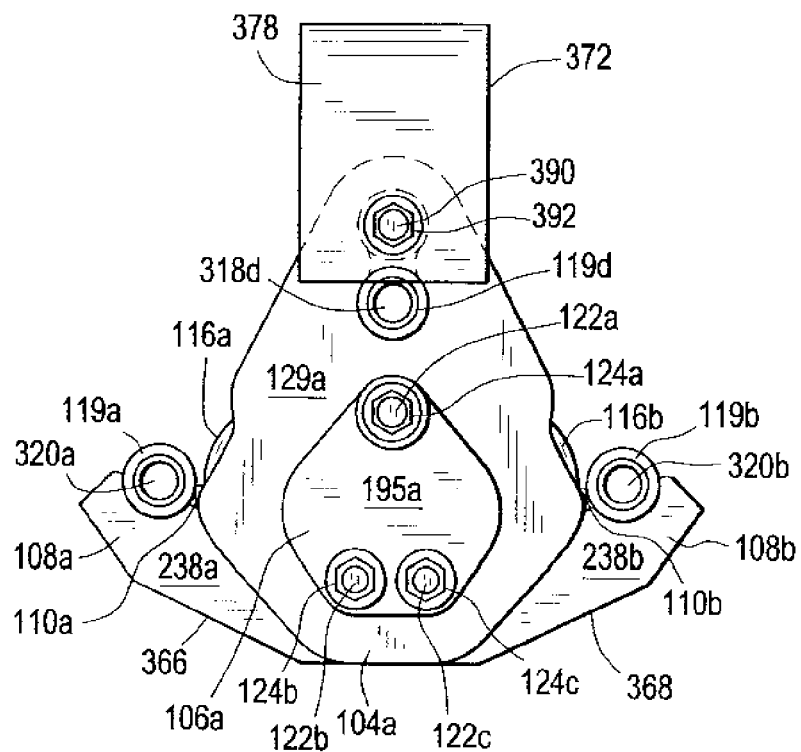

EQUALIZER FOR A SUSPENSION SYSTEM

BACKGROUND OF THE INVENTION

The invention is generally directed to an equalizer for a suspension system used in vehicles or trailers having tandem axles generally between 2,000 pounds and 7,000 pounds with double eye springs, such as recreational vehicles, mobile homes and light trailers of all types.

A prior art suspension system 20 currently used on trailers incorporates an equalizer 22 such as the one shown in FIG. 1. The suspension system 20 is mounted on a frame 24 of the left side of the trailer and another, identical suspension system 20 is mounted on the frame 24 of the right side of the trailer. Only the suspension system 20 mounted on the frame 24 of the left side of the trailer is shown in FIG. 1. The suspension system 20 includes the equalizer 22, a front leaf spring 26, a rear leaf spring 28, a front shackle or link 30 and a rear shackle or link 32.

The equalizer 22 is generally triangular in shape, having a first end corner 34, a second end corner 36 and a third end corner 38. Other equalizers of the prior art may be curved rather than triangular in shape. The equalizer 22 is generally formed of cast iron and is rigid. The first end corner 34 of the equalizer 22 is attached to a center frame hangar 40, which depends from the frame 24 of the trailer, at a point A. The second end corner 36 of the equalizer 22 is pivotally mounted to a first end 42 of the front shackle 30 at a point B. The third end corner 38 of the equalizer 22 is pivotally mounted to a first end 44 of the rear shackle 32 at a point C.

A second end 46 of the front shackle 30 is pivotally mounted to a rear end 48 of the front leaf spring 26 at a point D. A front end 50 of the front leaf spring 26 is attached to the frame 24 of the trailer at a point E.

A second end 52 of the rear shackle 32 is pivotally mounted to a front end 54 of the rear leaf spring 28 at a point F. A rear end 56 of the rear leaf spring 28 is attached to the frame 24 of the trailer at a point G.

A front axle 58 is positioned on the forward leaf spring 26 generally equidistantly between point D and point E. A rear axle 60 is positioned on the rear leaf spring 28 generally equidistantly between point F and point G.

To the extent possible, road shock and vibrations from tires of the trailer are transferred to the front and rear axles 58, 60, and are absorbed by the front and rear leaf springs 26, 28, respectively. Points A, E and G are the contact points through which the road shock is passed to the frame 24. The equalizer 22 basically has only one purpose for being including in the suspension system 20, which is to equalize the weight on both the front and rear axles 58, 60 as the tires pass over uneven terrain. For example, an upward motion of the front leaf spring 26 results in a downward motion of the rear leaf spring 28.

The equalizer 22, however, is not configured to dampen or absorb the harsh shocks or vibrations coming off the rear end 48 of the front leaf spring 26 and the front end 54 of the rear leaf spring 28 proximate to the center frame hangar 40, which would thus allow for a "softer" ride. The equalizer 22 of the prior art has been in use without a single design change for at least the past forty (40) years.

Thus, there is a need for an equalizer which overcomes the aforementioned disadvantages. The present invention provides such an equalizer. Features and advantages of the present invention will become apparent upon a reading of the attached specification, in combination with a study of the drawings.

SUMMARY OF THE INVENTION

Briefly, and in accordance with the foregoing, the invention provides an equalizer for a suspension system for a trailer or the like which is configured to equalize the weight on both the front and rear axles of a trailer as tires of the trailer pass over uneven terrain, but which also is configured to dampen or absorb the harsh shocks or vibrations coming off of the rear end of a front leaf spring and the front end of a rear leaf spring proximate to a center frame hangar, thus allowing for a "softer" ride. The equalizer utilizes two independent equalizer arm assemblies which are each rotatably secured within the equalizer. Each equalizer arm assembly is operatively associated with one of the front or rear leaf springs such that upon upward movement of either the front or rear leaf spring, the associated equalizer arm assembly is forced to rotate within the equalizer and to deform a shock absorber provided within the equalizer. The shock absorber, upon the deformation thereof, absorbs the harsh shocks or vibrations which would otherwise normally be transferred from the leaf springs, to the equalizer, and thus to the frame of the trailer.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIG. 5 is a perspective view of a secondary base plate of the equalizer;

FIG. 6 is a front view of the secondary base plate;

FIG. 7 is a perspective view of an equalizer arm of the equalizer;

FIG. 8 is a front view of the equalizer arm;

FIG. 33 is a front view of the equalizer rotatably secured to a center frame hangar of a trailer about a first point of the equalizer;

FIG. 34 is a front view of the equalizer rotatably secured to the center frame hangar of the trailer about a second point of the equalizer;

DETAILED DESCRIPTION OF THE ILLUSTRATED EMBODIMENT

Figure 1:
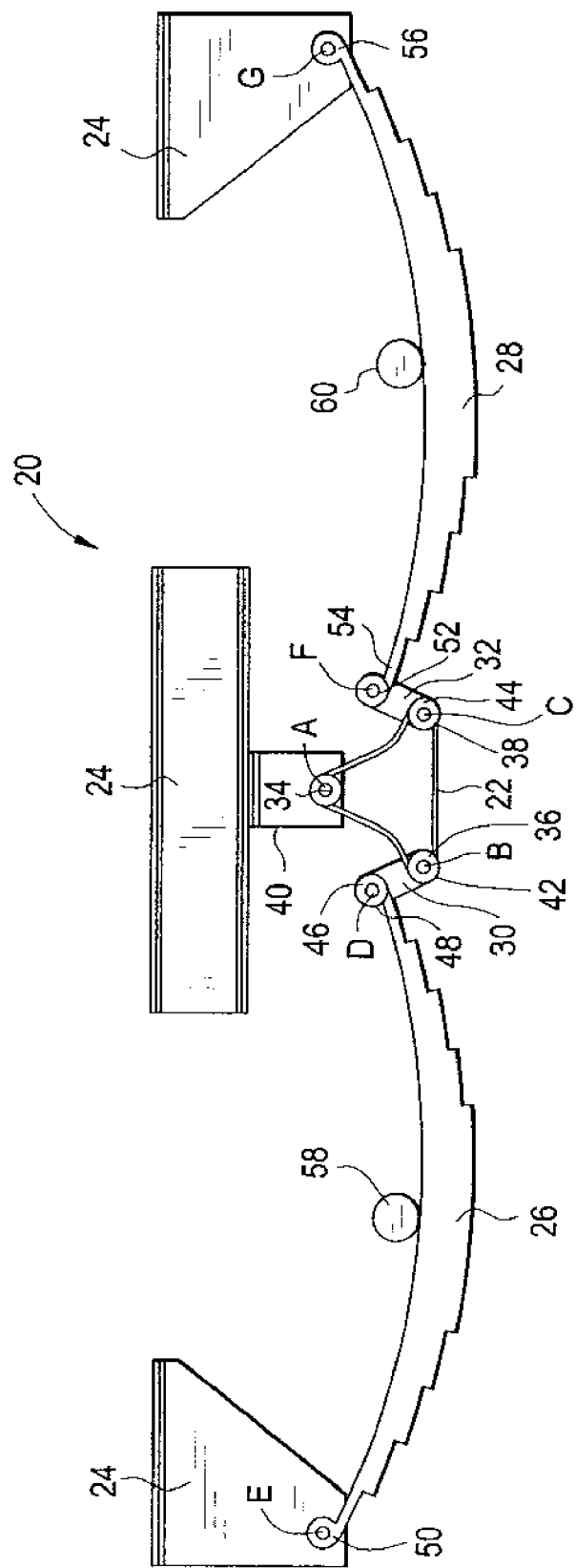
FIG. 1 is a view of a prior art equalizer incorporated into a suspension system which is mounted on a frame of a trailer.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

It is to be understood that where dimensions are used in the description of the illustrated embodiment, these dimensions are those for the preferred embodiment of the illustrated embodiment. It is to be further understood that modifications to the dimensions may be made in keeping with the spirit of the invention, and that the dimensions are not intended to limit the invention to those dimensions described. Also, it is also to be understood that the drawings may not be drawn to scale in conformance with the dimensions described herein.

Figure 2:
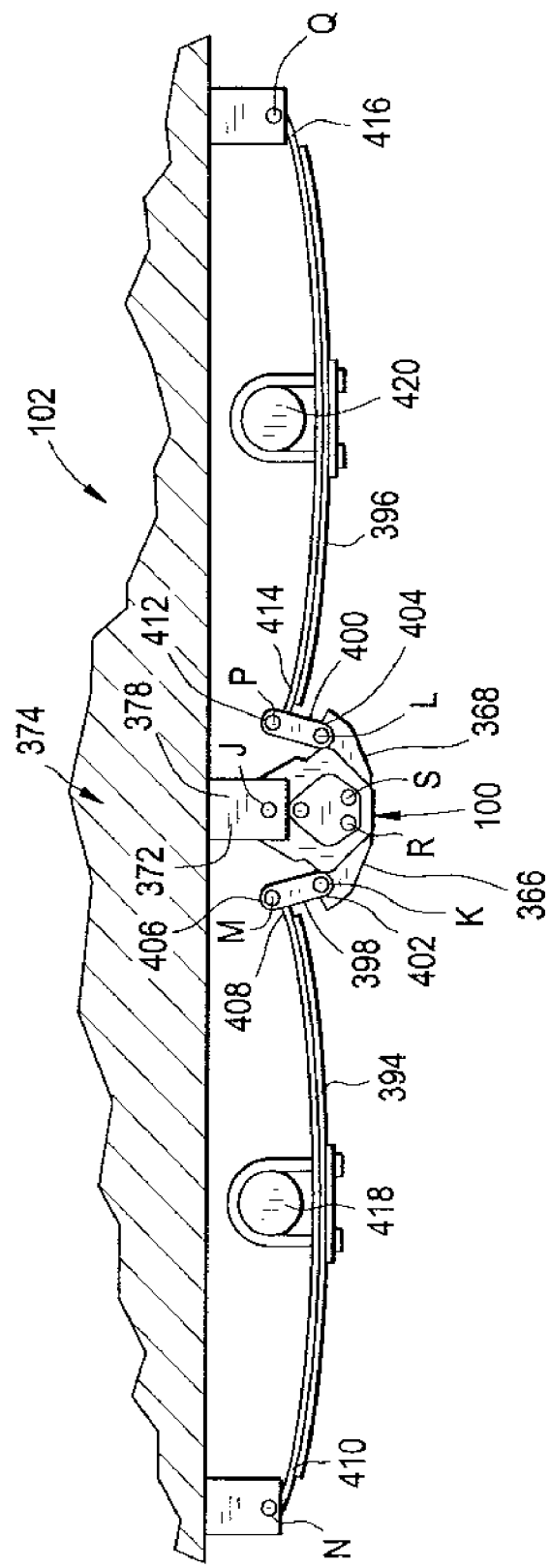
FIG. 2 is a view of an equalizer which incorporates the features of the present invention incorporated into a suspension system which is mounted on a frame of a trailer.

An equalizer 100 is provided for use in a suspension system 102, as illustrated in FIG. 2, to equalize the weight on both the front and rear axles 418, 420 as the tires pass over uneven terrain (as does the equalizer 22 of the prior art suspension system 20), as well as to dampen or absorb the harsh shocks or vibrations coming off the rear end 408 of the front leaf spring 394 and the front end 414 of the rear leaf spring 396 proximate to the center frame hangar 372, thus allowing for a "softer" ride. As best illustrated in FIGS. 32-36, the equalizer 100 includes first and second base plates 104a, 104b, first and second secondary base plates 106a, 106b, first and second equalizer arms 108a, 108b, first and second lower shock plates 110a, 110b, first and second upper shock plates 112a, 112b, a reinforcement plate 114, first and second shock absorbers 116a, 116b, first, second, third and fourth upper pivot tubes 119a, 119b, 119c, 119d, first and second lower pivot tubes 120a, 102b, first, second and third fastening members 122a, 122b, 122c, first, second and third securing members 124a, 124b, 124c, and a base or shock spacer 126.

Figure 3:
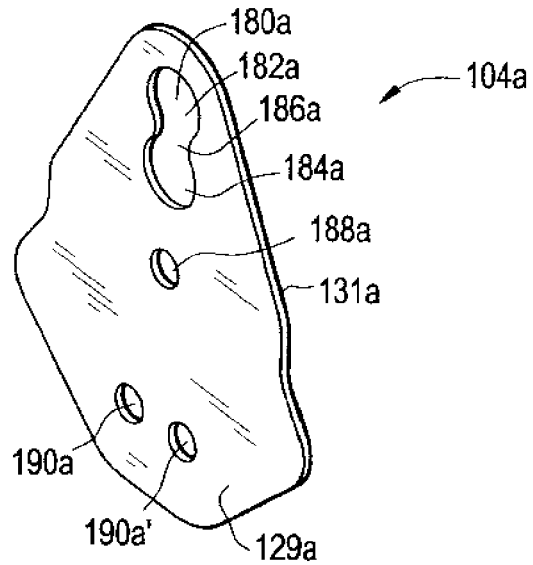
FIG. 3 is a perspective view of a base plate of the equalizer.
Figure 4:
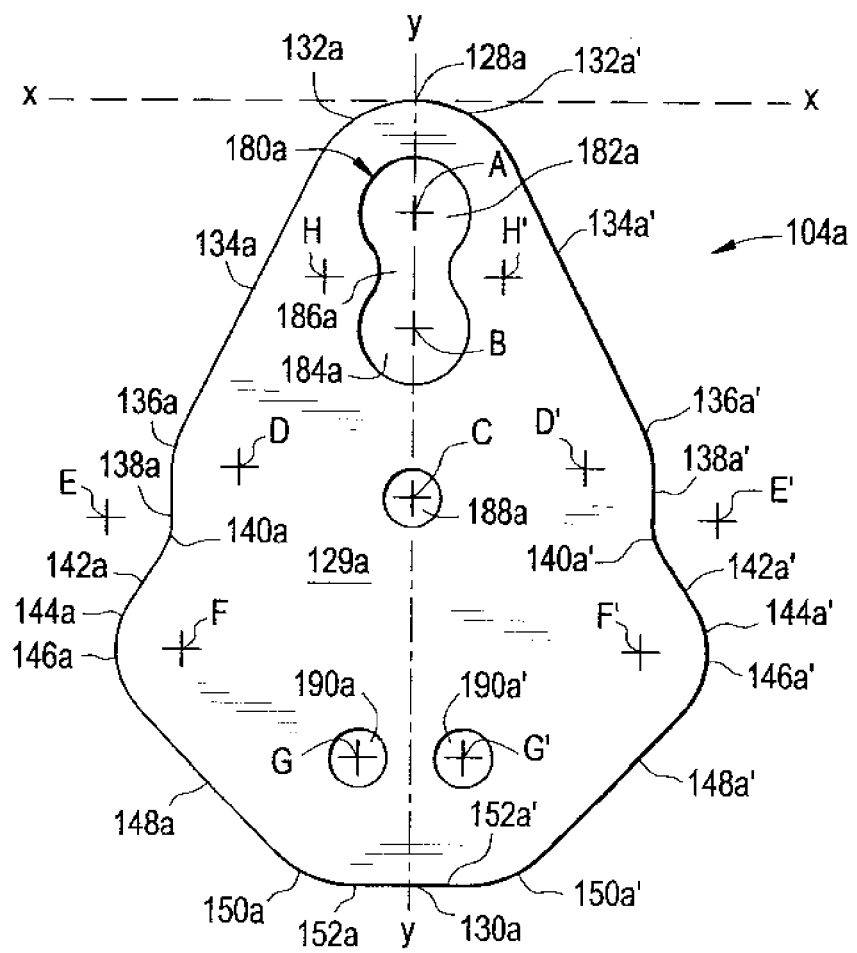
FIG. 4 is a front view of the base plate.

FIGS. 3 and 4 illustrate the first base plate 104a, which is preferably formed of a forged, cast or fabricated metal. The first base plate 104a is identical in shape and configuration to the second base plate 104b. As such, only the first base plate 104a is described with the understanding that the description of the second base plate 104b would be identical. The elements of the first base plate 104a will have reference numerals ending in "a". As such, it is to be understood that the elements of the second base plate 104b will have like reference numerals ending in "b".

The configuration of first base plate 104a is defined with reference to a horizontal reference line X and a vertical center reference line Y, provided in FIG. 4. The first base plate 104a is a generally triangular thin plate having first and second side surfaces 129a, 131a separated by an edge described herein.

A top 128a of the first base plate 104a is provided at the intersection of the horizontal reference line X and the vertical center reference line Y. A bottom 130a of the first base plate 104a is provided at a predetermined distance below the top 128a, for example 7.688 inches below. A first reference point A is provided at a predetermined distance below the top 128a, for example 1.125 inches below, along the reference line Y. A second reference point B is provided at a predetermined distance below the top 128a, for example 2.250 inches below, along the reference line Y, and is spaced apart from and below reference point A. A third reference point C is provided at a predetermined distance below the top 128a, for example 3.875 inches below, along the reference line Y, and is spaced apart from and below reference point B. A fourth reference point D is provided at a predetermined distance below the reference line X, for example 3.604 inches below, and at a predetermined distance to the left of reference line Y, for example 1.797 inches to the left. A fifth reference point E is provided at a predetermined distance below the reference line X, for example 4.104 inches below, and at a predetermined distance to the left of reference line Y, for example 3.172 inches to the left, and falls outside of the physical surface of the first base plate 104a. A sixth reference point F is provided at a predetermined distance below the reference line X, for example 5.409 inches below, and at a predetermined distance to the left of reference line Y, for example 2.387 inches to the left. A seventh reference point G is provided at a predetermined distance below the reference line X, for example 6.438 inches below, and at a predetermined distance to the left of reference line Y, for example 0.563 inches to the left. An eighth reference point H is provided at a predetermined distance below the reference line X, for example approximately 1.75 inches below, and at a predetermined distance to the left of reference line Y, for example approximately 0.625 inches to the left. Reference points E is provided outside of the perimeter of the first base plate 104a, whereas reference points A, B, C, D, F, G, H are provided inside of the perimeter of the first base plate 104a.

The left side of the first base plate 104a (everything to the left of the reference line Y as viewed in FIG. 3) is described, with the understanding that the right side of the first base plate 104a (everything to the right of the reference line Y as viewed in FIG. 3) is the mirror image. As such, the edges, apertures and reference points on the right side are not described and are denoted with a prime.

From the top 128a, a first edge portion 132a is formed as an arc about reference point A at a predetermined radius, for example at a radius of 1.125 inches. Thus, the first edge portion 132a curves downwardly and to the left of reference line Y. A third edge portion 136a is formed as an arc about reference point D at a predetermined radius, for example at a radius of 0.687 inches. A second edge portion 134a is formed as a line which is tangent to both the first edge portion 132a and the third edge portion 136a. Thus, the second edge portion 134a extends downwardly and to the left from the first edge portion 132a to the third edge portion 136a, and the third edge portion 136a curves downwardly and to the left from the second edge portion 134a. A fifth edge portion 140a is formed as an arc about reference point E at a predetermined radius, for example at a radius of 0.688 inches. A fourth edge portion 138a is formed as a line which is tangent to both the third edge portion 136a and the fifth edge portion 140a. Thus, the fourth edge portion 138a extends downwardly and to the left from the third edge portion 136a to the fifth edge portion 140a, and the fifth edge portion 140a curves downwardly and to the left from the fourth edge portion 138a. A seventh edge portion 144a is formed as an arc about reference point F at a predetermined radius, for example at a radius of 0.687 inches. A sixth edge portion 142a is formed as a line which is tangent to both the fifth edge portion 140a and the seventh edge portion 144a. Thus, the sixth edge portion 142a extends downwardly and to the left from the fifth edge portion 140a to the seventh edge portion 144a, and the seventh edge portion 144a curves downwardly and to the left from the sixth edge portion 142a to a left end 146a, which is the furthermost left point along the perimeter of the first base plate 104a from reference line Y, and further curves downwardly and to the right from the left end 146a. A ninth edge portion 150a is formed as an arc about reference point G at a predetermined radius, for example at a radius of 1.250 inches. An eighth edge portion 148a is formed as a line which is tangent to both the seventh edge portion 144a and the ninth edge portion 150a. Thus, the eighth edge portion 148a extends downwardly and to the right from the seventh edge portion 144a to the ninth edge portion 150a, and the ninth edge portion 150a curves downwardly and to the right from the eighth edge portion 148a. A tenth edge portion 152a is formed as a line which is tangent to the ninth edge portion 150a and which is parallel to the reference line X. Thus, the tenth edge portion 152a extends straight to the right from the ninth edge portion 150a to the bottom 130a.

A first aperture 180a is formed through the first base portion 104a and extends from the first surface 129a to the second surface 131a. The first aperture 180a is generally shaped like an hourglass and includes a first section 182a, a second section 184a, and a third connecting section 186a which connects the first section 182a to the second section 184a. The first, second and third sections 182a, 184a, 186a are all illustrated as being bisected by the reference line Y such that half of the first, second and third sections 182a, 184a, 186a are provided on the left side of the first base portion 104a and such that the other half of the first, second and third sections 182a, 184a, 186a are provided on the right side of the first base portion 104a.

The first portion 182a is formed by a circle with a predetermined radius defined about reference point A, for example a radius of 1.125 inches. The second portion 184a is formed by a circle with a predetermined radius defined about reference point B, for example a radius of 1.125 inches. The circles defining the first and second portions 182a, 184a are tangential to one another at a point which is on the same horizontal plane as reference points H and H'. The connecting portion 186a is defined by edges of the first aperture 180a formed at a predetermined radius about reference points H and H', respectively, for example at a radius of 0.375 inches, such that the first aperture 180a is relatively hourglass shaped.

A second aperture 188a is formed through the first base portion 104a and extends from the first surface 129a to the second surface 131a. The second aperture 188a is formed by a circle with a predetermined radius defined about reference point C, for example with a radius of 0.29 inches. The second aperture 188a is illustrated as being bisected by the reference line Y such that half of the second aperture 188a is provided on the left side of the first base portion 104a and such that the other half of the second aperture 188a is provided on the right side of the first base portion 104a.

A third aperture 190a is formed through the first base portion 104a and extends from the first surface 129a to the second surface 131a. The third aperture 190a is formed by a circle with a predetermined radius defined about reference point G, for example with a radius of 0.29 inches.

A fourth aperture 190a' is formed through the first base plate 104a and extends from the first surface 129a to the second surface 131a. The fourth aperture 190a' is formed on the right side of the first base plate 104a and is the mirror image of the third aperture 190a, which is formed on the left side of the first base plate 104a.

FIGS. 5 and 6 illustrate the first secondary base plate 106a, which is preferably formed of a forged, cast or fabricated metal. The first secondary base plate 106a is identical in shape and configuration to the second secondary base plate 106b. As such, only the first secondary base plate 106a is described with the understanding that the description of the second secondary base plate 106a would be identical. The elements of the first secondary base plate 106a will have reference numerals ending in "a". As such, it is to be understood that the elements of the second base plate 106b will have like reference numerals ending in The configuration of the first secondary base plate 106a is defined with reference to a horizontal reference line X and a vertical center reference line Y, provided in FIG. 6. The first secondary base plate 106a is a generally triangular thin plate having first and second side surfaces 195a, 197a separated by an edge described herein.

A top 194a of the secondary base plate 106a is provided at the intersection of the horizontal reference line X and the vertical center reference line Y. A bottom 196a of the secondary base plate 106a is provided at a predetermined distance below the top 194a, for example 3.75 inches below. A first reference point A is provided at a predetermined distance below the top 194a, for example 0.563 inches, along the reference line Y. A second reference point B is provided at a predetermined distance below the reference line X, for example 2.169 inches below, and at a predetermined distance to the left of reference Y, for example 0.281 inches. A third reference point C is provided at a predetermined distance below the reference line X, for example 3.125 inches below, and at a predetermined distance to the left of reference Y, for example 0.563 inches. Reference points A, B and C are all provided inside the perimeter of the first secondary base plate 106a.

The left side of the first secondary base plate 106a (everything to the left of the reference line Y as viewed in FIG. 6) is described, with the understanding that the right side of the first secondary base plate 106a (everything to the right of the reference line Y as viewed in FIG. 6) is the mirror image. As such, the edges, apertures and reference points on the right side are not described and are denoted with a prime.

From the top 194a, a first edge portion 198a is formed as an arc about reference point A at a predetermined radius, for example at a radius of 0.562 inches. Thus, the first edge portion 198a curves downwardly and to the left of reference line Y. A third edge portion 202a is formed as an arc about reference point B at a predetermined radius, for example at a radius of 1.5 inches. A second edge portion 200a is formed as a line which is tangent to both the first edge portion 198a and the third edge portion 202a. Thus, the second edge portion 200a extends downwardly and to the left from the first edge portion 198a to the third edge portion 202a, and the third edge portion 202a curves downwardly and to the left from the second edge portion 200a to a left end 204a, which is the furthermost left point along the perimeter of the first secondary base plate 106a from reference line Y, and further curves downwardly and to the right from the left end 204a. A fifth edge portion 208a is formed as an arc about reference point C at a predetermined radius, for example at a radius of 0.625 inches. A fourth edge portion 206a is formed as a line which is tangent to both the third edge portion 202a and the fifth edge portion 208a. Thus, the fourth edge portion 206a extends downwardly and to the right from the third edge portion 202a to the fifth edge portion 208a, and the fifth edge portion 208a curves downwardly and to the right from the fourth edge portion 206a. A sixth edge portion 210a is formed as a line which is tangent to the fifth edge portion 208a and which is parallel to the reference line X. Thus, the sixth edge portion 210a extends straight to the right from the fifth edge portion 208a to the bottom 196a.

A first aperture 230a is formed through the first secondary base plate 106a and extends from the first surface 195a to the second surface 197a. The first aperture 230a is formed by a circle with a predetermined radius defined about reference point A, for example with a radius of 0.29 inches. The first aperture 230a is illustrated as being bisected by the reference line Y such that half of the first aperture 230a is provided on the left side of the first secondary base plate 106a and such that the other half of the first aperture 230a is provided on the right side of the first secondary base plate 106a.

A second aperture 232a is formed through the first secondary base plate 106a and extends from the first surface 195a to the second surface 197a. The second aperture 232a is formed by a circle with a predetermined radius defined about reference point C, for example with a radius of 0.29 inches.

A third aperture 232a' is formed through the first secondary base plate 106a and extends from the first surface 195a to the second surface 197a. The third aperture 232a' is formed on the right side of the first secondary base plate 106a and is the mirror image of the second aperture 232a, which is formed on the left side of the first secondary base plate 106a.

FIGS. 7 and 8 illustrate the first equalizer arm 108a, which is preferably formed of a forged, cast or fabricated metal. The first equalizer arm 108a is identical in shape and configuration to the second equalizer arm 108b. As such, only the first equalizer arm 108a is described with the understanding that the description of the second equalizer arm 108b would be identical. The elements of the first equalizer arm 108a will have reference numerals ending in "a". As such, it is to be understood that the elements of the second equalizer arm 108b will have like reference numerals ending in "b".

The configuration of the first equalizer arm 108a is defined with reference to a horizontal reference line X and a vertical center reference line Y, provided in FIG. 8. The first equalizer arm 108a is a thin plate having first and second side surfaces 238a, 239a separated by an edge described herein.

A bottom 236a of the first equalizer arm 108a is provided at the intersection of the horizontal reference line X and the vertical center reference line Y. A first reference point A is provided at a predetermined distance above the bottom 236a, for example 2.173 inches above. A second reference point B is provided at a predetermined distance above the reference line X, for example 1.5 inches above, and at a predetermined distance to the left of reference line Y, for example 1.75 inches. Reference points A and B are provided outside of the perimeter of the first equalizer arm 108a.

The left side of the first equalizer arm 108a (everything to the left of the reference line Y as viewed in FIG. 8) is described, with the understanding that the right side of the first equalizer arm 108a (everything to the right of the reference line Y as viewed in FIG. 8) is the mirror image. As such, the edges and reference points on the right side are not described and are denoted with a prime.

From the bottom 236a, a first edge portion 240a extends straight to the left of reference line Y, along reference line X, for a predetermine distance, for example 1.504 inches. A left end 244a of the first equalizer arm 108a, which is the furthermost left point along the perimeter of the first equalizer arm 108a from reference line Y, is provided at a predetermined distance from both the reference line X and the reference line Y, for example 0.612 inches above reference line X and 2.794 inches to the left of reference line Y. A second edge portion 242a extends straight upwardly and to the left of reference line Y from the first edge portion 240a to the left end 244a. A top left end 248a of the first equalizer arm 108a is provided at a predetermined distance from both the reference line X and the reference line Y, for example 1.375 inches above reference line X and 2.432 inches to the left of reference line Y. From the left end 244a, a third edge portion 246a extends straight upwardly and to the right to the top left end 248a. A fifth edge portion 252a is formed as an arc about reference point B at a predetermined radius, for example at a radius of 0.535 inches. From the top left end 248a, a fourth edge portion 250a extends straight to the right toward the reference line Y and parallel to the reference line X, to an end of the fifth edge portion 252a. A seventh edge portion 256a is formed as an arc about reference point A at a predetermined radius, for example at a radius of 1.338 inches. A sixth edge portion 254a extends parallel to the reference line X and is co-planar with the fourth edge portion 250a. The sixth edge portion 254a connects the fifth edge portion 252a to the seventh edge portion 256a. The fifth edge portion 252a thus curves downwardly and to the right from the fourth edge portion 250a and then upwardly and to the right to the sixth edge portion 254a. The seventh edge portion 256a thus curves downwardly and to the right from the sixth edge portion 254a to the reference line Y, to a predetermined position above the bottom 236a, for example 0.835 inches above.

Figure 9:
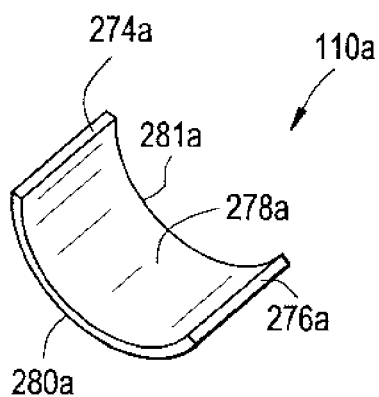
FIG. 9 is a perspective view of a lower shock plate of the equalizer.
Figure 10:
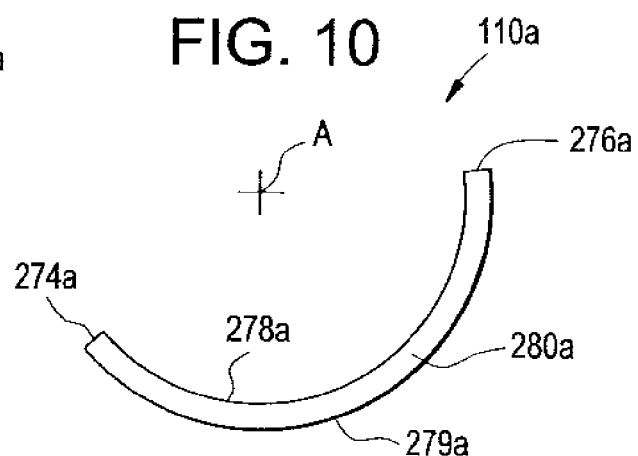
FIG. 10 is a front view of the lower shock plate.

Attention is directed to FIGS. 9 and 10 which illustrate the first lower shock plate 110a, which is preferably formed of a forged, cast or fabricated metal. The first lower shock plate 110a is identical in shape and configuration to the second lower shock plate 110b. As such, only the first lower shock plate 110a is described with the understanding that the description of the second lower shock plate 100b would be identical. The elements of the first lower shock plate 110a will have reference numerals ending in "a". As such, it is to be understood that the elements of the second lower shock plate 110b will have like reference numerals ending in "b".

The first lower shock plate 110a is a thin plate which is curved from a first end 274a thereof to a second end 276a thereof. The first lower shock plate 110a has a generally uniform predetermined thickness from the first end 274a to the second end 276a, for example a thickness of 0.125 inches, such that the first lower shock plate 110a has an inner surface 278a, an outer surface 279a, a first side 280a, and a second side 281a. The inner surface 278a is formed as an arc about reference point A, as illustrated in FIG. 10, at a predetermined radius, for example at a radius of 1.188 inches. The first and second ends 274a, 276a are provided at a predetermined angle to one another relative to the reference point A, for example an angle of 145 degrees. The first and second ends 274a, 276a are provided at a predetermined linear distance to one another, for example a distance of 1.563 inches.

Figure 11:
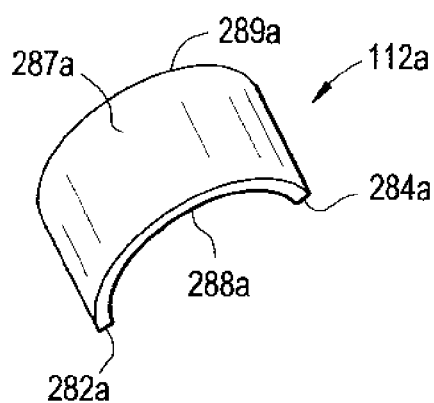
FIG. 11 is a perspective view of an upper shock plate of the equalizer.
Figure 12:
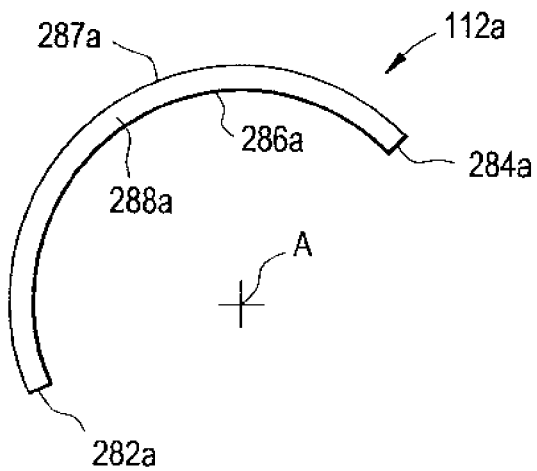
FIG. 12 is a front view of the upper shock plate.

Attention is directed to FIGS. 11 and 12 which illustrate the first upper shock plate 112a, which is preferably formed of a forged, cast or fabricated metal. The first upper shock plate 112a is identical in shape and configuration to the second upper shock plate 112b. As such, only the first upper shock plate 112a is described with the understanding that the description of the second upper shock plate 112b would be identical. The elements of the first upper shock plate 112a will have reference numerals ending in "a". As such, it is to be understood that the elements of the second upper shock plate 112b will have like reference numerals ending in "b".

The first upper shock plate 112a is a thin plate which is curved from a first end 282a thereof to a second end 284a thereof. The first upper shock plate 112a has a generally uniform predetermined thickness from the first end 282a to the second end 284a, for example a thickness of 0.125 inches, such that the first upper shock plate 112a has an inner surface 286a, an outer surface 287a, a first side 288a, and a second side 289a. The inner surface 286a is formed as an arc about reference point A, as illustrated in FIG. 12, at a predetermined radius, for example at a radius of 1.188 inches. The first and second ends 282a, 284a are provided at a predetermined angle to one another relative to the reference point A, for example an angle of 160 degrees. The first and second ends 282a, 284a are provided at a predetermined linear distance to one another, for example a distance of 1.625 inches.

Figure 13:
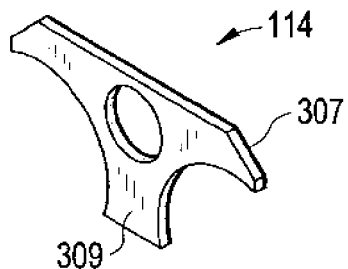
FIG. 13 is a perspective view of a reinforcement plate of the equalizer.
Figure 14:
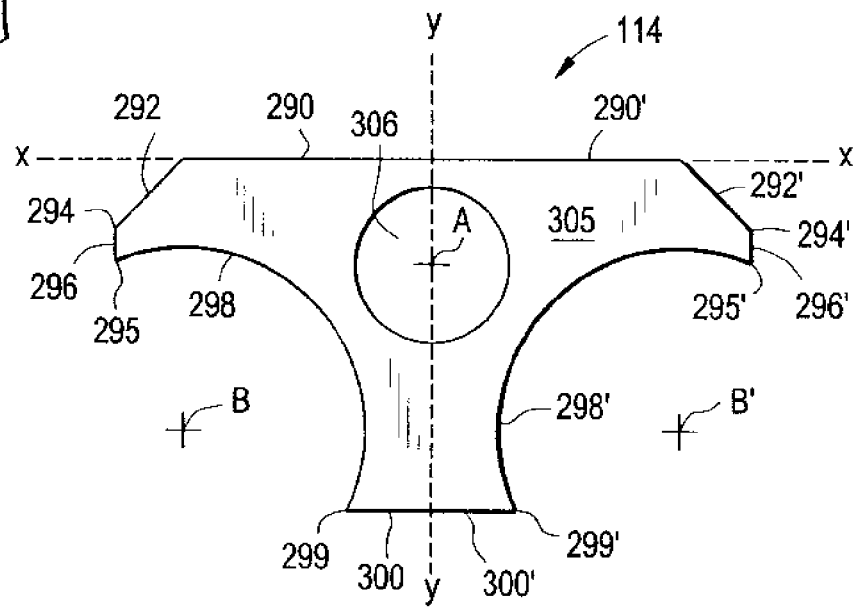
FIG. 14 is a front view of the reinforcement plate.

FIGS. 13 and 14 illustrate the reinforcement plate 114, which is preferably formed of a forged, cast or fabricated metal. The configuration of the reinforcement plate 114 is defined with reference to a horizontal reference line X and a vertical center reference line Y, provided in FIG. 14. The reinforcement plate 114 is a generally T-shaped thin plate having first and second side surfaces 305, 307 separated by an edge described herein.

A first reference point A is provided at a predetermined distance below the reference line X, for example 0.75 inches below, and along the reference line Y. A second reference point B is provided at a predetermined distance below the reference line X, for example 1.954 inches below, and at a predetermined distance to the left of reference line Y, for example 4.23 inches. Reference point B is provided outside of the perimeter of the reinforcement plate 114, whereas reference point A is provided inside of the perimeter of the reinforcement plate 114.

The left side of the reinforcement plate 114 (everything to the left of the reference line Y as viewed in FIG. 14) is described, with the understanding that the right side of the reinforcement plate 114 (everything to the right of the reference line Y as viewed in FIG. 14) is the mirror image. As such, the edges and reference point on the right side are not described and are denoted with a prime.

From the intersection of the reference lines X and Y, a first edge portion 290 extends straight to the left of reference line Y, along the reference line X, for a predetermined distance, for example 1.875 inches. A second edge portion 292 extends straight downwardly and to the left from the first edge portion 290 at a predetermined angle, for instance forty-five degrees, to a top end 294 of a third edge portion 296. The third edge portion 296 is parallel to the reference line Y and is provided at a predetermined distance to the left of reference line Y, for example 2.375 inches. A fifth edge portion 300, which is parallel to the reference line X, extends straight to the left from the reference line Y and is provided at a predetermined distance below the reference line X, for example 2.5 inches below. A fourth edge portion 298 is formed as an arc about reference point B at a predetermined radius, for example 1.338 inches. The fourth edge portion 298 curves from a bottom end 295 of the third edge portion 296 to a left end 299 of the fifth edge portion 300.

An aperture 306 is formed through the reinforcement plate 114 and extends from the first side surface 305 to the second side surface 307. The aperture 306 is formed by a circle with a predetermined radius defined about reference point A, for example with a radius of 0.5625 inches. The aperture 306 is illustrated as being bisected by the reference line Y such that half of the aperture 306 is provided on the left side of the reinforcement plate 114 and such that the other half of the aperture 306 is provided on the right side of the reinforcement plate 114.

Figure 15:
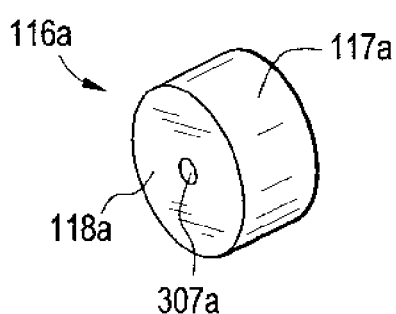
FIG. 15 is a perspective view of a shock absorber of the equalizer.

FIG. 15 illustrates the first shock absorber 116a. The first shock absorber 116a is identical in shape and configuration to the second shock absorber 116b. As such, only the first shock absorber 116a is described with the understanding that the description of the second shock absorber 116b would be identical. The elements of the first shock absorber 116a will have reference numerals ending in "a". As such, it is to be understood that the elements of the second shock absorber 116b will have like reference numerals ending in "b".

The first shock absorber 116a is preferably in the form of a cylindrical puck or disk and made of TORSILASTIC® rubber. The first shock absorber 116a has a cylindrical outer surface 117a provided between a first end surface 118a and a second end surface (not shown). An aperture 307a is provided through the first shock absorber 116a from the first end surface 118a to the second end surface. In use, the outer surface 117a is positioned between the inner surfaces 278a, 286a of the first lower shock plate 110a and the first upper shock plate 112a, respectively and, therefore, has a circumference which is correspondingly shaped to the first lower and upper shock plates 110, 112. For example, the outer surface 117a is formed at a radius of approximately 1.188 inches, which is the radius at which the inner surfaces 278a, 286a of the first lower and upper shock plates 110a, 112a, respectively, are formed.

Figure 16:
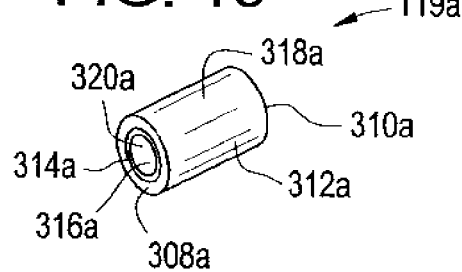
FIG. 16 is a perspective view of an upper pivot tube of the equalizer.
Figure 17:
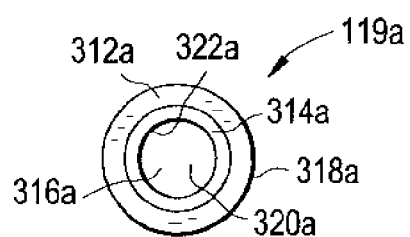
FIG. 17 is a side view of the upper pivot tube.

FIGS. 16 and 17 illustrate the first upper pivot tube 119a, which is preferably formed of a forged, cast or fabricated metal. The first upper pivot tube 119a is identical in shape and configuration to the second, third and fourth upper pivot tubes 119b, 119c, 119d. As such, only the first upper pivot tube 119a is described with the understanding that the description of the second, third and fourth upper pivot tubes 119*b*, 119*c*, 119*d* would be identical. The elements of the first upper pivot tube 119*a* will have reference numerals ending in "a". As such, it is to be understood that the elements of the second upper pivot tube 119*b* will have like reference numerals ending in "b"; the elements of the third upper pivot tube 119*c* will have like reference numerals ending in "c"; and the elements of the fourth upper pivot tube 119*d* will have like reference numerals ending in "d".

The first upper pivot tube 119*a* has a first end 308*a* and a second end 310*a*. In a preferred embodiment, a distance from the first end 308*a* to the second end 310*a* is approximately 1.75 inches. The first upper pivot tube 119*a* is formed of an outer tube 312*a* and an inner tube or bushing 314*a*. The outer tube 312*a* extends from the first end 308*a* to the second end 310*a* and has an aperture 316*a* which extends therethrough from the first end 308*a* to the second end 310*a*. The outer tube 312*a* thus has an outer surface 318*a* and an inner surface (not shown). In a preferred embodiment, the outer tube 312*a* has an outer diameter of approximately 1.07 inches and an inner diameter of approximately 0.75 inches. The inner tube or bushing 314*a* is positioned within the aperture 316*a* of the outer tube 312*a* and extends from the first end 308*a* to the second end 310*a*. The inner tube or bushing 314*a* defines an aperture 320*a* which extends therethrough from the first end 308*a* to the second end 310*a*. The inner tube 314*a* thus has an outer surface (not shown) and an inner surface 322*a*. In a preferred embodiment, the inner tube 314*a* has an outer diameter of approximately 0.75 inches and an inner diameter of approximately 0.565 inches. The outer surface of the inner tube 314*a* is configured and sized to snugly fit against the inner surface of the outer tube 312*a*.

Figure 18:
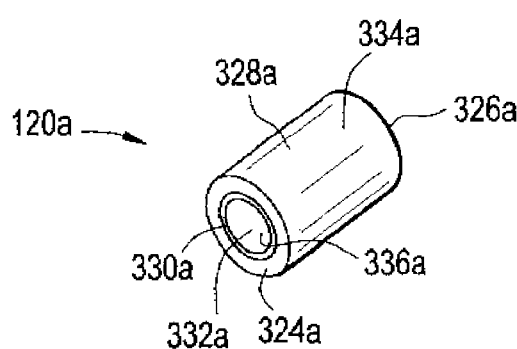
FIG. 18 is a perspective view of a lower pivot tube of the equalizer.
Figure 19:
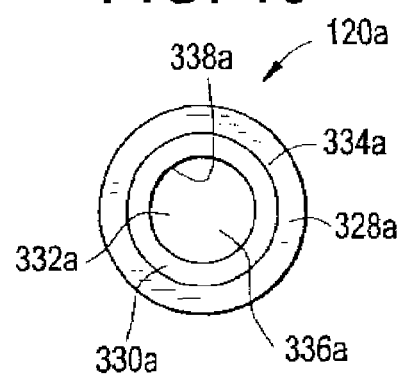
FIG. 19 is a side view of the lower pivot tube.

FIGS. 18 and 19 illustrate the first lower pivot tube 120*a*, which is preferably formed of a forged, cast or fabricated metal. The first lower pivot tube 120*a* is identical in shape and configuration to the second lower pivot tube 120*b*. As such, only the first lower pivot tube 120*a* is described with the understanding that the description of the second lower pivot tube 120*b* would be identical. The elements of the first lower pivot tube 120*a* will have reference numerals ending in "a". As such, it is to be understood that the elements of the second lower pivot tube 120*b* will have like reference numerals ending in "b".

The first lower pivot tube 120*a* has a first end 324*a* and a second end 326*a*. A distance from the first end 324*a* to the second end 326*a* is predetermined, for example approximately 1.563 inches. The first lower pivot tube 120*a* is formed of an outer tube 328*a* and an inner tube or bushing 330*a*. The outer tube 328*a* extends from the first end 324*a* to the second end 326*a* and has an aperture 332*a* which extends therethrough from the first end 324*a* to the second end 326*a*. The outer tube 328*a* thus has an outer surface 334*a* and an inner surface (not shown). The outer tube 328*a* has a predetermined outer diameter, for example approximately 1.07 inches, and a predetermined inner diameter, for example approximately 0.75 inches. The inner tube or bushing 330*a* is positioned within the aperture 332*a* of the outer tube 328*a* and extends from the first end 324*a* to the second end 326*a*. The inner tube or bushing 330*a* defines an aperture 336*a* which extends therethrough from the first end 324*a* to the second end 326*a*. The inner tube 330*a* thus has an outer surface (not shown) and an inner surface 338*a*. The inner tube 330*a* has a predetermined outer diameter, for example approximately 0.75 inches, and a predetermined inner diameter, for example approximately 0.565 inches. The outer surface of the inner tube 330*a* is configured and sized to snugly fit against the inner surface of the outer tube 328*a*.

Figure 20:
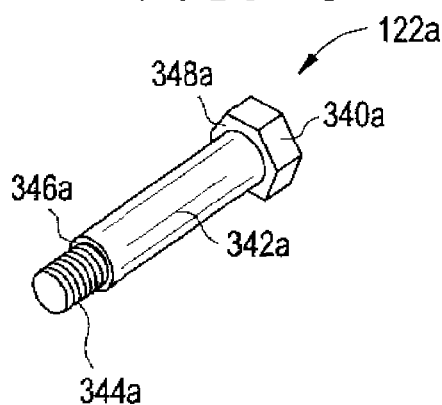
FIG. 20 is a perspective view of a fastening member of the equalizer.

FIG. 20 illustrates the first fastening member 122*a*. The first fastening member 122*a* is identical in shape and configuration to the second and third fastening members 122*b*, 122*c*. As such, only the first fastening member 122*a* is described with the understanding that the description of the second and third fastening members 122*b*, 122*c* would be identical. The elements of the first fastening member 122*a* will have reference numerals ending in "a". As such, it is to be understood that the elements of the second fastening member 122*b* will have like reference numerals ending in "b" and the elements of the third fastening member 122*c* will have like reference numerals ending in "c".

The first fastening member 122*a* is preferably a bolt having an enlarged head portion 340*a*, a first shaft portion 342*a*, and a second shaft portion 344*a*. The enlarged head portion 340*a* preferably is a hex-head, but other shapes are within the scope of the invention. The first shaft portion 342*a* extends from the enlarged head portion 340*a* and is preferably cylindrical. The second shaft portion 344*a* extends from the first shaft portion 342*a*, such that the first shaft portion 342*a* is positioned between the enlarged head portion 340*a* and the second shaft portion 344*a*, and is preferably cylindrical and externally threaded. The second shaft portion 344*a* preferably has a predetermined outer diameter which is smaller than a predetermined outer diameter of the first shaft portion 342*a* such that a shoulder 346*a* is provided between the first and second shaft portions 342*a*, 344*a*. The predetermined outer diameter of the first shaft portion 342*a* is preferably smaller than a predetermined outer diameter of the enlarged head portion 340*a* such that a shoulder 348*a* is provided between the enlarged head portion 340*a* and the first shaft portion 342*a*.

Figure 21:
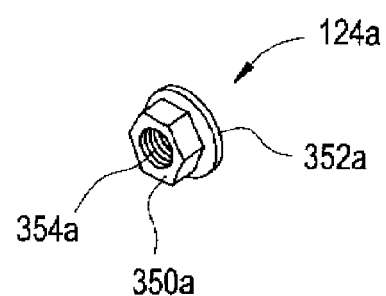
FIG. 21 is a perspective view of a securing member of the equalizer.

FIG. 21 illustrates the first securing member 124*a*. The first securing member 124*a* is identical in shape and configuration to the second and third securing members 124*b*, 124*c*. As such, only the first securing member 124*a* is described with the understanding that the description of the second and third securing members 124*b*, 124*c* would be identical. The elements of the first securing member 124*a* will have reference numerals ending in "a". As such, it is to be understood that the elements of the second securing member 124*b* will have like reference numerals ending in "b" and the elements of the third securing member 124*c* will have like reference numerals ending in "c".

The first securing member 124*a* preferably includes a conventional nut 350*a* secured to a conventional washer 352*a*. The nut 350*a* preferably has a hex-head. The nut 350*a* and the washer 352*a* have an aperture 354*a* extending therethrough. The aperture 354*a* defines an aperture wall which is preferably at least partially threaded.

Figure 22:
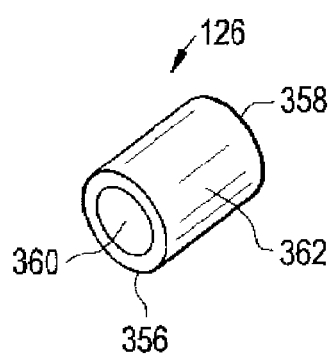
FIG. 22 is a perspective view of a shock spacer of the equalizer.
Figure 23:
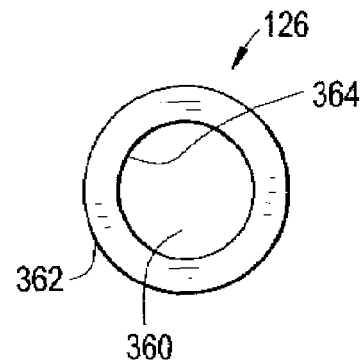
FIG. 23 is a side view of the shock spacer.

FIGS. 22 and 23 illustrate the base or shock spacer 126, which is preferably formed of a forged, cast or fabricated metal. The base or shock spacer 126 has a first end 356 and a second end 358. A distance from the first end 356 to the second end 358 is predetermined, for example approximately 1.625 inches. The base or shock spacer 126 is formed as a tube and has an aperture 360 which extends therethrough from a first end 356 to a second end 358. The base or shock spacer 126 thus has an outer surface 362 and an inner surface 364. An outer diameter of the base or shock spacer 126 at the outer surface 362 thereof is predetermined, for example approximately 1.07 inches, and an inner diameter of the base or shock spacer 126 at the inner surface 364 thereof is predetermined, for example approximately 0.75 inches.

FIGS. 2 and 24-38 illustrate the construction of the equalizer 100 alone and in conjunction with the suspension system 102, as well as the function of the equalizer 100 with the suspension system 102.

Figure 24:
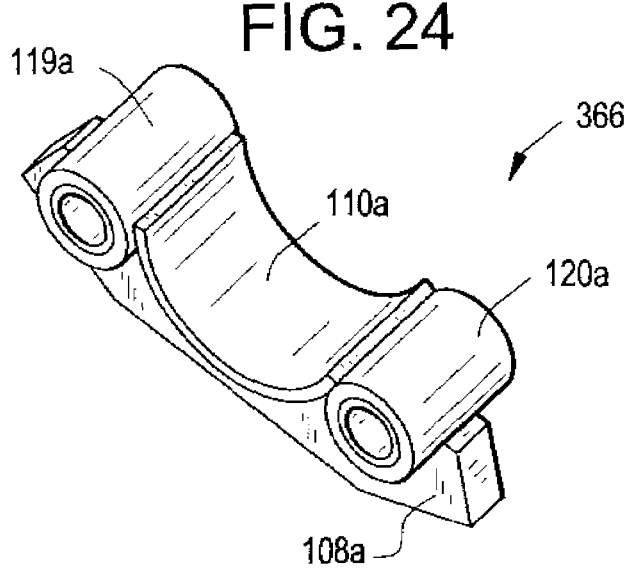
FIG. 24 is a perspective view of an equalizer arm assembly of the equalizer.
Figure 25:
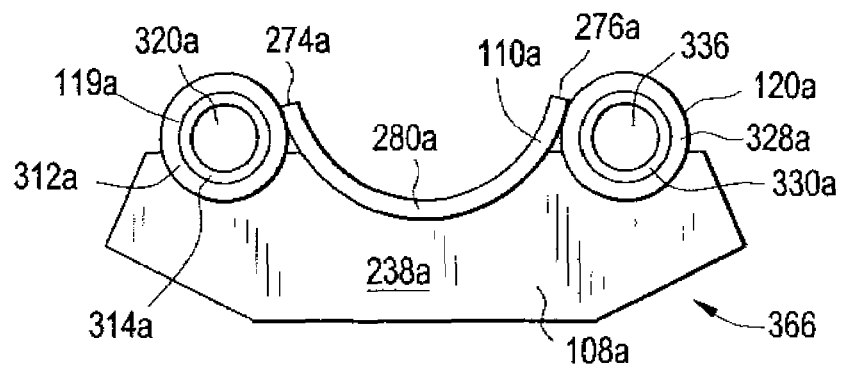
FIG. 25 is a front view of the equalizer arm assembly.
Figure 26:
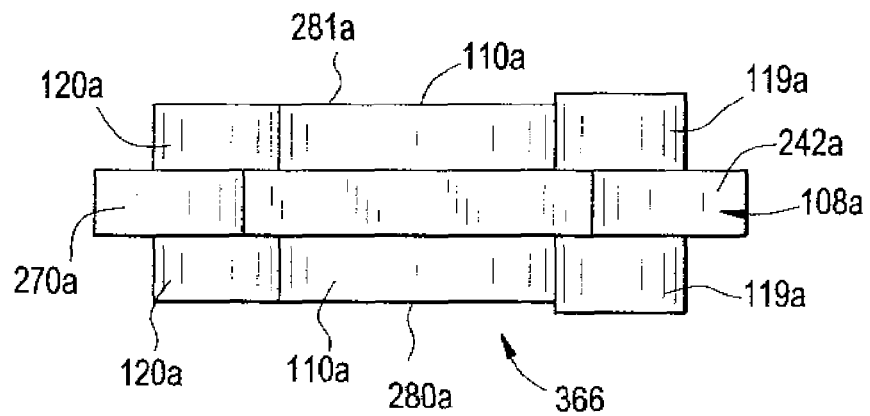
FIG. 26 is a bottom view of the equalizer arm assembly.
Figure 27:
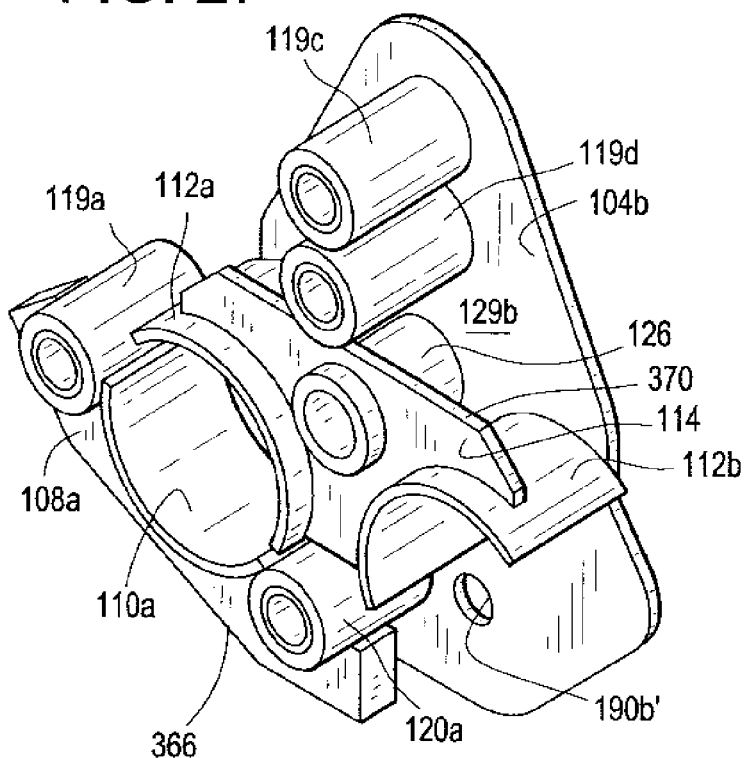
FIGS. 27-32 are perspective views illustrating the formation of the equalizer.
Figure 28:
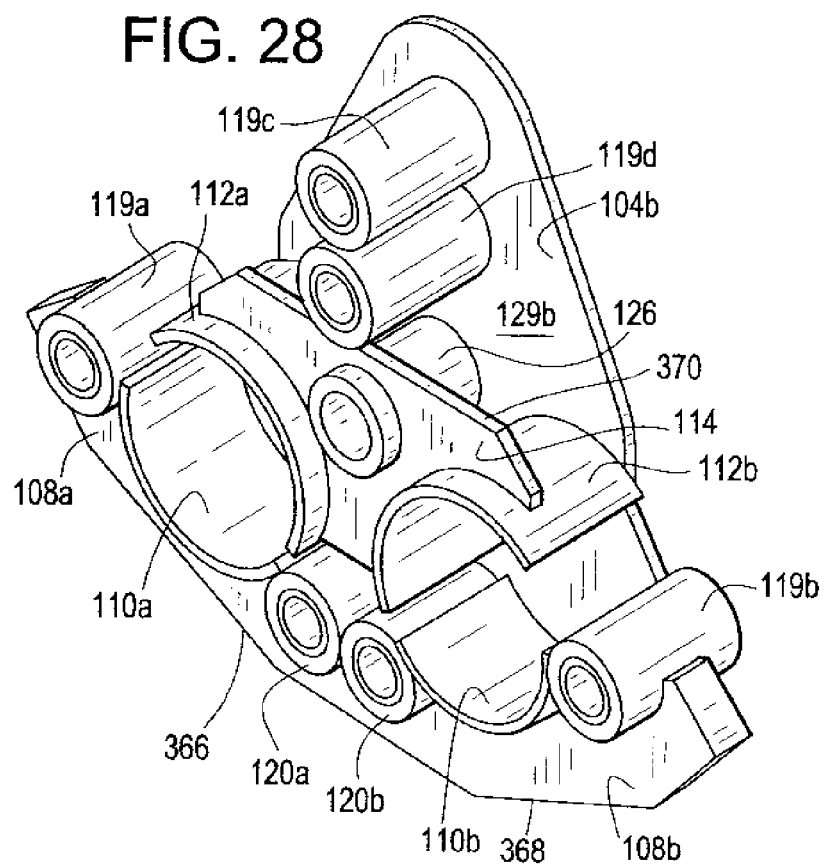
Figure 29:
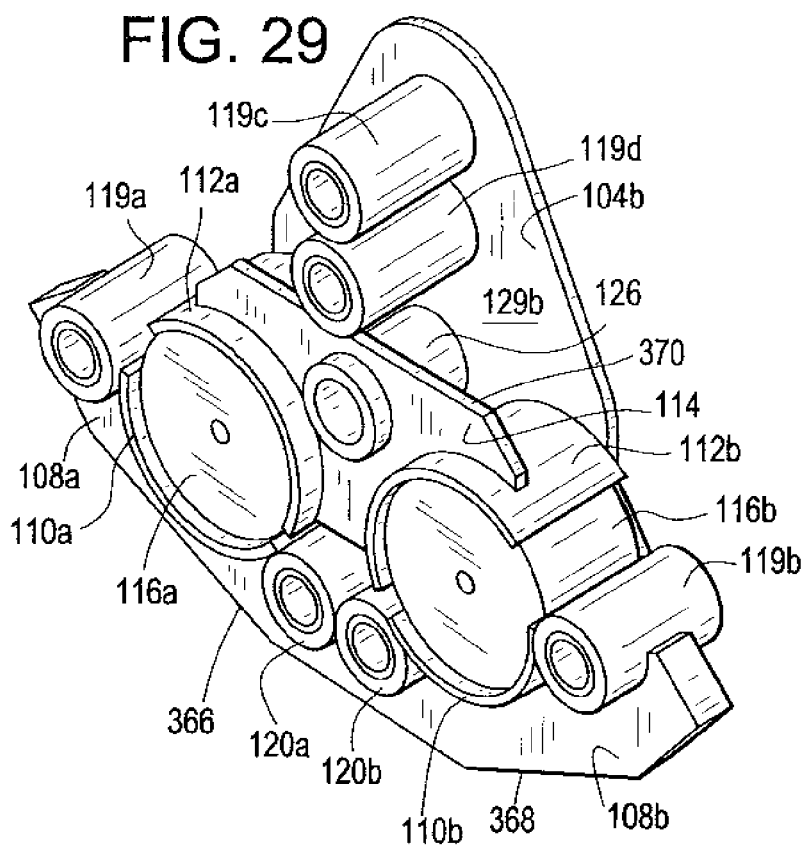

The equalizer 100 is constructed by forming first and second equalizer arm assemblies 366, 368. The configuration of the first equalizer arm assembly 366 is illustrated in FIGS. 24-26. The first equalizer arm assembly 366 includes the first equalizer arm 108a, the first lower shock plate 110a, the first upper pivot tube 119a, and the first lower pivot tube 120a.

The outer surface 318a of the outer tube 312a of the first upper pivot tube 119a is positioned against the fifth edge portion 252a of the first equalizer arm 108a, such that the first end 308a of the first upper pivot tube 119a extends outwardly from the first surface 238a of the first equalizer arm 108a and such that the second end 310a of the first upper pivot tube 119a extends outwardly from the second surface 239a of the first equalizer arm 108a. The outer surface 318a of the outer tube 312a of the first upper pivot tube 119a is fixedly secured to the first equalizer arm 108a, preferably by welding.

The outer surface 334a of the outer tube 328a of the first lower pivot tube 120a is positioned against the fifth edge portion 252a' of the first equalizer arm 108a, such that the first end 324a of the first lower pivot tube 120a extends outwardly from the first surface 238a of the first equalizer arm 108a and such that the second end 326a of the first lower pivot tube 120a extends outwardly from the second surface 239a of the first equalizer arm 108a. The first end 324a is provided closer to the first surface 238a of the first equalizer arm 108a than is the first end 308a of the first upper pivot tube 119a, and the second end 326a is provided closer to the second surface 239a of the first equalizer arm 108a than is the second end 310a of the first upper pivot tube 119a. The outer surface 334a of the outer tube 328a of the first lower pivot tube 120a is fixedly secured to the first equalizer arm 108a, preferably by welding.

The outer surface 279a of the first lower shock plate 110a is positioned against the seventh edge portions 256a, 256a' of the first equalizer arm 108a, such that the first side 280a of the first lower shock plate 110a extends outwardly from the first surface 238a of the first equalizer arm 108a and such that the second side 281a of the first lower shock plate 110a extends outwardly from the second surface 239a of the first equalizer arm 108a. The first side 280a is substantially flush with the first end 324a of the first lower pivot tube 120a, and the second side 282a is substantially flush with the second end 326a of the first lower pivot tube 120a. The outer surface 279a of the first lower shock plate 110a is fixedly secured to the first equalizer arm 108a, preferably by welding. The outer surface 279a of the first lower shock plate 110a, proximate to the first end 274a thereof, faces, and may abut against, the outer surface 318a of the outer tube 312a of the first upper pivot tube 119a. The outer surface 279a of the first lower shock plate 110a, proximate to the second end 276a thereof, faces, and may abut against, the outer surface 334a of the outer tube 328a of the first lower pivot tube 120a.

The second equalizer arm assembly 368 includes the second equalizer arm 108b, the second lower shock plate 110b, the second upper pivot tube 119b, and the second lower pivot tube 120b. The configuration of the second equalizer arm assembly 368 is identical to the configuration of the first equalizer arm assembly 366, illustrated in FIGS. 24-26, except that the outer surface 318b of the outer tube 312b of the second upper pivot tube 119b is positioned against the fifth edge portion 252b' of the second equalizer arm 108b, as opposed to the fifth edge portion 252b, and the outer surface 334b of the outer tube 328b of the first lower pivot tube 120b is positioned against the fifth edge portion 252b of the second equalizer arm 108b, as opposed to the fifth edge portion 252b'.

Attention is invited to FIGS. 2 and 27-36. The equalizer 100 is further constructed by forming a reinforcement plate assembly 370. The reinforcement plate assembly 370 includes the reinforcement plate 114, the shock spacer 126, and the first and second upper shock plates 112a, 112b.

The shock spacer 126 is inserted through the aperture 306 of the reinforcement plate 114 such that the first end 356 of the shock spacer 126 extends outwardly from the first surface 305 of the reinforcement plate 114 and such that the second end 358 of the shock spacer 126 extends outwardly from the second surface 307 of the reinforcement plate 114. The second end 358 preferably extends further outwardly from the second surface 307 than does the first end 356 from the first surface 305. The outer surface 362 is preferably generally positioned against a wall defined by the aperture 306, and the outer surface 362 is fixedly secured to the reinforcement plate 114, preferably by welding. The shock spacer 126 spaces the reinforcement plate 114 from the first and second base plates 104a, 104b The outer surface 287a of the first upper shock plate 112a is positioned against the fourth edge portion 298 of the reinforcement plate 114, such that the first side 288a of the first upper shock plate 112a extends outwardly from the first surface 305 of the reinforcement plate 114 and such that the second side 289a of the first upper shock plate 112a extends outwardly from the second surface 307 of the reinforcement plate 114. The outer surface 287a of the first upper shock plate 112a is fixedly secured to the reinforcement plate 114, preferably by welding. The second side 289a preferably extends further outwardly from the second surface 307 than does the first side 288a from the first surface 305. The first side 288a is substantially planar with the first end 356 of the shock spacer 126, and the second side 289a is substantially planar with the second end 358 of the shock spacer 126.

The outer surface 287b of the second upper shock plate 112b is positioned against the fourth edge portion 298' of the reinforcement plate 114, such that the first side 288b of the second upper shock plate 112b extends outwardly from the first surface 305 of the reinforcement plate 114 and such that the second side 289b of the second upper shock plate 112b extends outwardly from the second surface 307 of the reinforcement plate 114. The outer surface 287b of the second upper shock plate 112b is fixedly secured to the reinforcement plate 114, preferably by welding. The second side 289b preferably extends further outwardly from the second surface 307 than does the first side 288b from the first surface 305. The first side 288b is substantially planar with the first end 356 of the shock spacer 126, and the second side 289b is substantially planar with the second end 358 of the shock spacer 126.

The reinforcement plate assembly 370 is positioned against the first surface 129b of the second base plate 104b such that the second end 358 of the shock spacer 126, and the second sides 289a, 289b of the first and second upper shock plates 112a, 112b, abut against the first surface 129b of the second base plate 104b. The aperture 360 of the shock spacer 126 is aligned with the second aperture 188b of the second base plate 104b. The reinforcement plate assembly 370 is fixedly secured to the first surface 129b of the second plate 104b, preferably by welding the outer surface 362 of the shock spacer 126 to the first surface 129b of the second plate 104b, by welding the outer surface 287a of the first upper shock plate 112a to the first surface 129b, proximate to the fourth edge portion 138b thereof, and by welding the outer surface 287b of the second upper shock plate 112b to the first surface 129b, proximate to the fourth edge portion 138b' thereof.

The third upper pivot tube 119c is positioned within the first portion 182b of the first aperture 180b of the second base plate 104b such that the second end 310c of the third upper pivot tube 119c is substantially flush with the second surface 131b of the second base plate 104b. The outer surface 318c of the outer tube 312c of the third upper pivot tube 119c is fixedly secured to the first surface 129b of the second base plate 104b, preferably by welding.

The fourth upper pivot tube 119d is positioned within the second portion 184b of the first aperture 180b of the second base plate 104b such that the second end 310d of the fourth upper pivot tube 119d is substantially flush with the second surface 131b of the second base plate 104b. The outer surface 318d of the outer tube 312d of the fourth upper pivot tube 119d is fixedly secured to the first surface 129b of the second base plate 104b, and to the outer surface 318c of the outer tube 312c of the third upper pivot tube 119c, preferably by welding.

The first equalizer arm assembly 366 is positioned such that the second end 326a of the first lower pivot tube 120a faces the first surface 129b of the second base plate 104b. The aperture 336a of the first lower pivot tube 120a is in alignment with the aperture 190b provided through the second base plate 104b. The inner surfaces 278a, 286a of the first lower and upper shock plates 110a, 112a face one another. The first shock absorber 116a is positioned between the inner surfaces 278a, 286a of the first lower and upper shock plates 110a, 112a such that the outer surface 117a of the first shock absorber 116a generally abuts against or faces the inner surfaces 278a, 286a of the first lower and upper shock plates 110a, 112a. The first shock absorber 116a is held in place between the first lower and upper shock plates 110a, 112a. The first end 274a of the first lower shock plate 110a is spaced from the first end 282a of the first upper shock plate 112a. The second end 276a of the first lower shock plate 110a is spaced from the second end 284a of the first upper shock plate 112a.

The second equalizer arm assembly 368 is positioned such that the second end 326b of the second lower pivot tube 120b faces the first surface 129b of the second base plate 104b. The aperture 336b of the second lower pivot tube 120b is in alignment with the aperture 192b provided through the second base plate 104b. The inner surfaces 278b, 286b of the second lower and upper shock plates 110b, 112b face one another. The second shock absorber 116b is positioned between the inner surfaces 278b, 286b of the second lower and upper shock plates 110b, 112b such that the outer surface 117b of the second shock absorber 116b generally abuts against or faces the inner surfaces 278b, 286b of the second lower and upper shock plates 110b, 112b. The second shock absorber 116b is held in place between the first lower and upper shock plates 110b, 112b. The first end 274b of the second lower shock plate 110b is spaced from the first end 282b of the second upper shock plate 112b. The second end 276b of the second lower shock plate 110b is spaced from the second end 284b of the second upper shock plate 112b.

Figure 30:
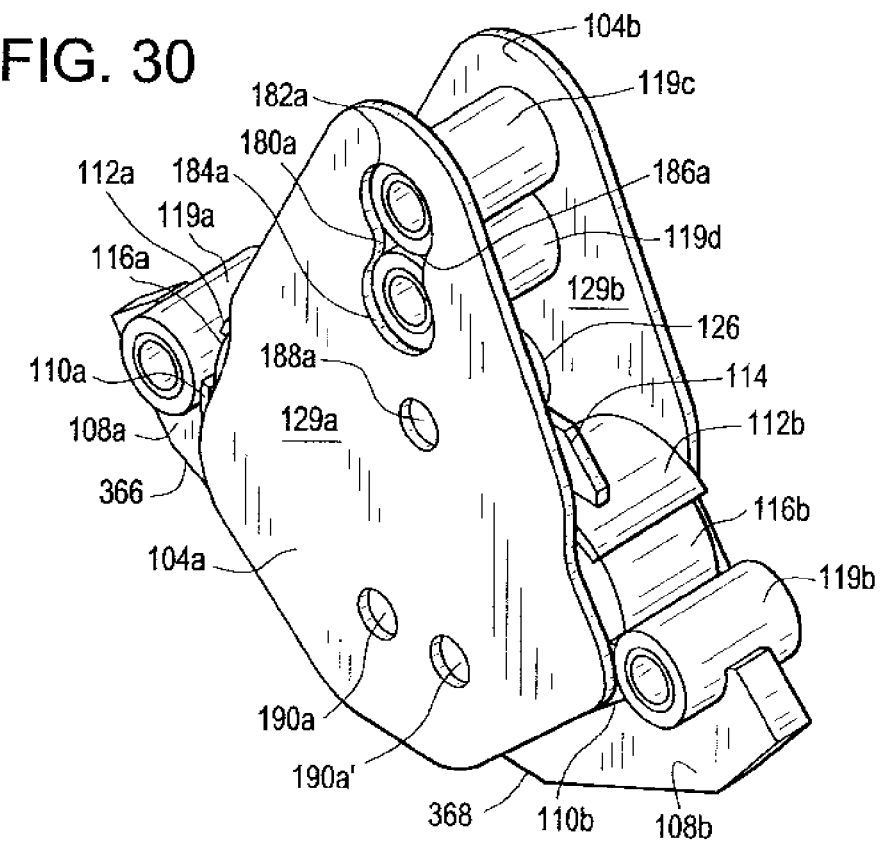

The first base plate 104a is positioned, as illustrated in FIG. 30, such that the first end 308c of the third upper pivot tube 119c extends into, from the second surface 131a of the first base plate 104a, the first portion 182a of the first aperture 180a of the first base plate 104a; such that the first end 308d of the fourth upper pivot tube 119d extends into, from the second surface 131a of the first base plate 104a, the second portion 184a of the first aperture 180a of the first base plate 104a; such that the first end 356 of the shock spacer 126 faces the second surface 131a of the first base plate 104a, with the aperture 360 of the shock spacer 126 being in alignment with the second aperture 188a of the first base plate 104a; such that the first end 324a of the first lower pivot tube 120a faces the second surface 131a of the first base plate 104a, with the aperture 336a of the first lower pivot tube 120a being in alignment with the third aperture 190a of the first base plate 104a; such that the first end 324b of the second lower pivot tube 120b faces the second surface 131a of the first base plate 104a, with the aperture 336b of the second lower pivot tube 120b being in alignment with the fourth aperture 190a' of the first base plate 104a; such that the first sides 280a, 280b, 288a, 288b of the first and second lower and upper shock plates 110a, 110b, 112a, 112b, respectively, face the second surface 131a of the first base plate 104a; and such that the first surfaces 118a, 118b of the first and second shock absorbers 116a, 116b, respectively, face the second surface 131a of the first base plate 104a.

Figure 31:
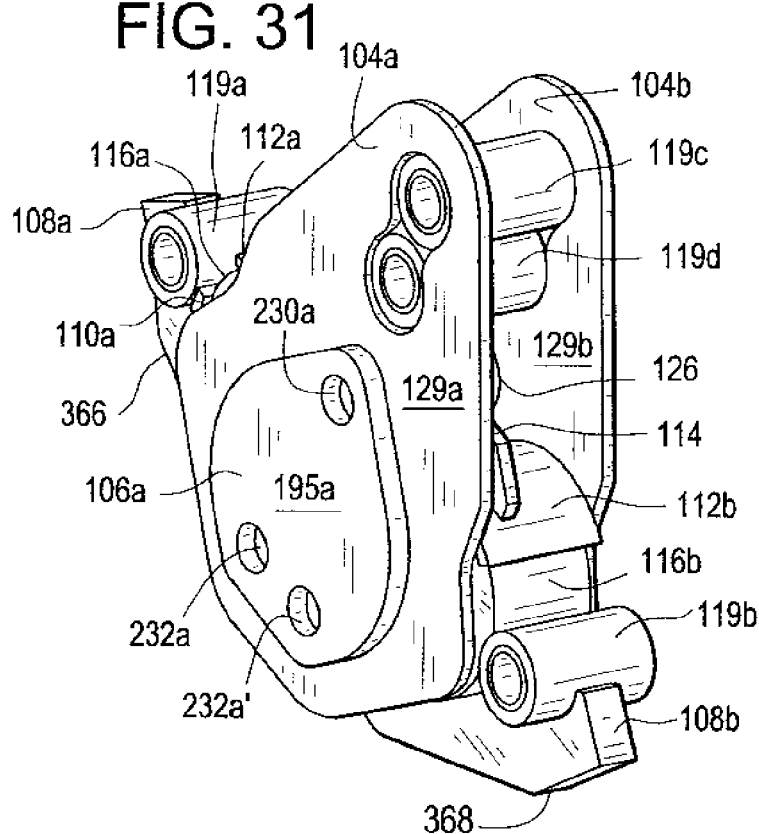

As illustrated in FIG. 31, the second surface 197a of the first secondary base plate 106a is positioned against the first surface 129a of the first base plate 104a such that the first aperture 230a of the first secondary base plate 106a is in alignment with the second aperture 188a of the first base plate 104a, the second aperture 232a of the first secondary base plate 106a is in alignment with the third aperture 190a of the first base plate 104a, and the third aperture 232a' of the first secondary base plate 106a is in alignment with the fourth aperture 192a of the first base plate 104a. The first secondary base plate 106a is fixedly secured to the first surface 129a of the first base plate 104a, preferably by welding.

Likewise, although not explicitly illustrated, the first surface 195b of the second secondary base plate 106b is positioned against the second surface 131b of the second base plate 104b such that the first aperture 230b of the second secondary base plate 106b is in alignment with the second aperture 188b of the second base plate 104b, the second aperture 232b of the second secondary base plate 106b is in alignment with the third aperture 190b of the second base plate 104b, and the third aperture 232b' of the second secondary base plate 106b is in alignment with the fourth aperture 190b' of the second base plate 104b. The second secondary base plate 106b is fixedly secured to the second surface 131b of the second base plate 104b, preferably by welding.

Figure 32:
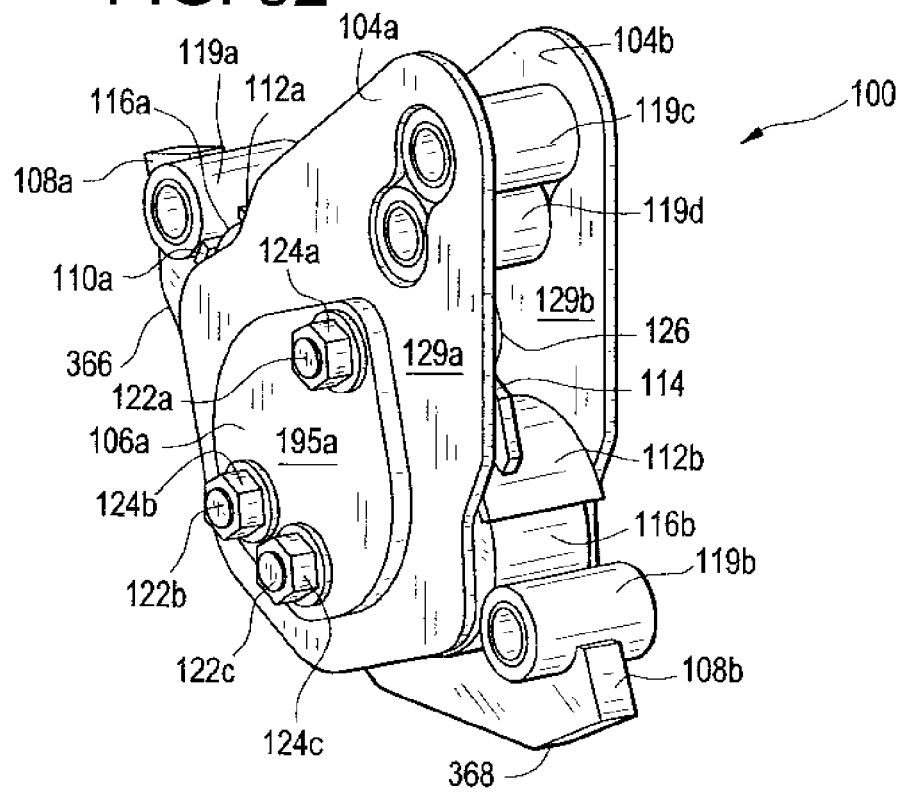
Figure 35:
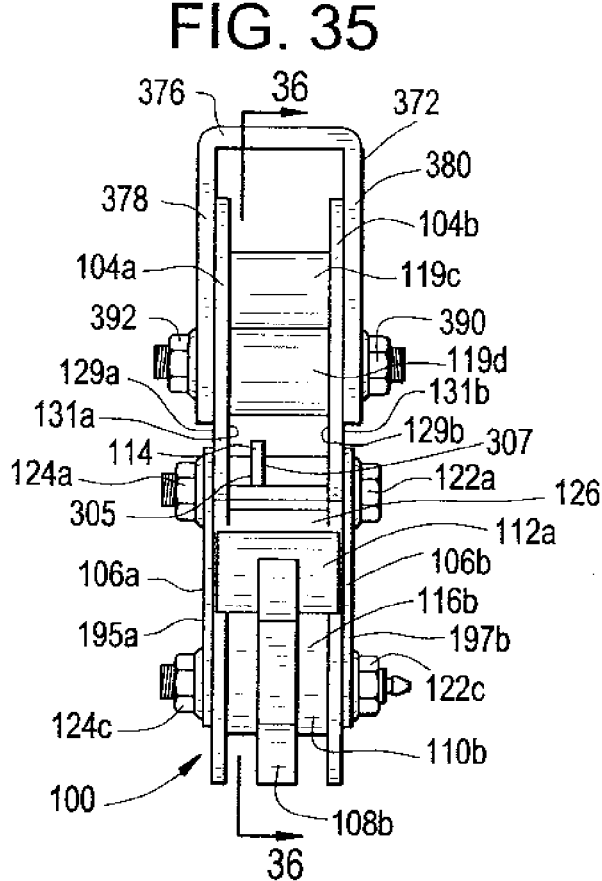
FIG. 35 is a side view of the equalizer rotatably secured to the center frame hangar as illustrated in FIG. 33.
Figure 36:
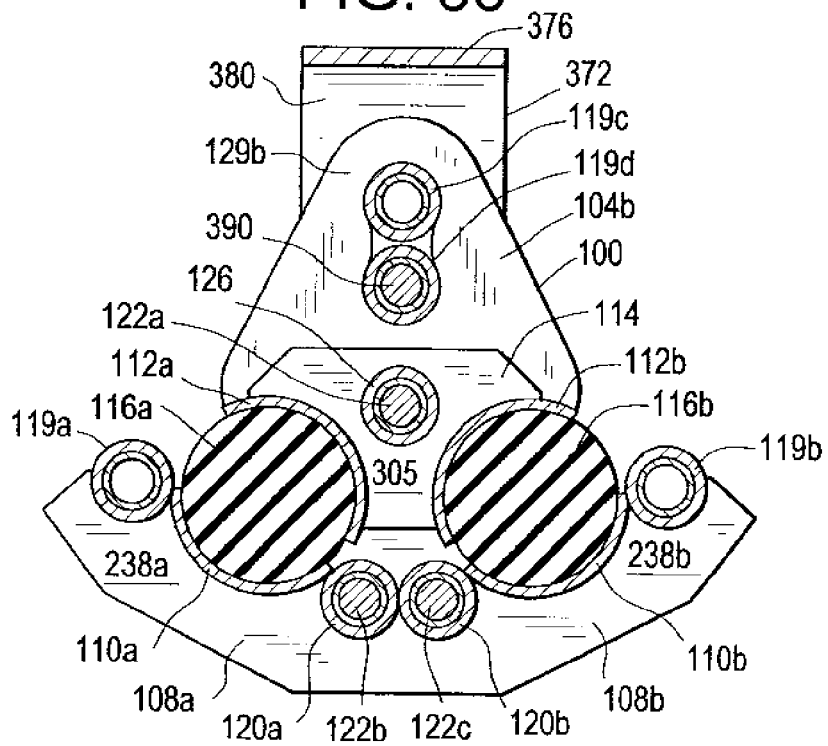
FIG. 36 is a cross-sectional view of the equalizer rotatably secured to the center frame hangar taken along line 36-36 of FIG. 35.

As best illustrated in FIG. 32, the first fastening member 122a extends through the first aperture 230b of the second secondary base plate 106b, through the second aperture 188b of the second base plate 104b, through the aperture 360 of the shock spacer 126, through the second aperture 188a of the first base plate 104a, and through the first aperture 230a of the first secondary base plate 106a, such that the shoulder 348a of the first fastening member 122a abuts against the second surface 197b of the second secondary base plate 106b and at least a portion of the threaded, second shaft portion 344a of the first fastening member 122a extends beyond the first surface 195a of the first secondary base plate 106a. The first securing member 124a is threaded onto the threaded, second shaft portion 344a of the first fastening member 122*a* such that the washer member 352*a* is tightly positioned against the first surface 195*a* of the first secondary base plate 106*a*. The reinforcement plate assembly 370 is thus fixedly secured to the first base plate 104*a* by the first fastening and securing members 122*a*, 124*a*.

The second fastening member 122*b* extends through the second aperture 232*b* of the second secondary base plate 106*b*, through the third aperture 190*b* of the second base plate 104*b*, through the aperture 336*a* of the first lower pivot tube 120*a*, through the third aperture 190*a* of the first base plate 104*a*, and through the second aperture 232*a* of the first secondary base plate 106*a*, such that the shoulder 348*b* of the second fastening member 122*b* abuts against the second surface 197*b* of the second secondary base plate 106*b* and at least a portion of the threaded, second shaft portion 344*b* of the second fastening member 122*b* extends beyond the first surface 195*a* of the first secondary base plate 106*a*. The second securing member 124*b* is threaded onto the threaded, second shaft portion 344*b* of the second fastening member 122*b* such that the washer member 352*b* is tightly positioned against the first surface 195*a* of the first secondary base plate 106*a*.

The third fastening member 122*c* extends through the third aperture 232*b'* of the second secondary base plate 106*b*, through the fourth aperture 190*b'* of the second base plate 104*b*, through the aperture 336*b* of the second lower pivot tube 120*b*, through the fourth aperture 190*a'* of the first base plate 104*a*, and through the third aperture 232*a'* of the first secondary base plate 106*a*, such that the shoulder 348*c* of the third fastening member 122*c* abuts against the second surface 197*b* of the second secondary base plate 106*b* and at least a portion of the threaded, second shaft portion 344*c* of the third fastening member 122*c* extends beyond the first surface 195*a* of the first secondary base plate 106*a*. The third securing member 124*c* is threaded onto the threaded, second shaft portion 344*c* of the third fastening member 122*c* such that the washer member 352*c* is tightly positioned against the first surface 195*a* of the first secondary base plate 106*a*. The first equalizer arm assembly 366 is thus rotatably secured or pivotally mounted between the first and second base plates 104*a*, 104*b* by the second fastening and securing members 122*b*, 124*b*. The second equalizer arm assembly 368 is thus rotatably secured or pivotally mounted between the first and second base plates 104*a*, 104*b* by the third fastening and securing members 122*c*, 124*c*.

The equalizer 100 is thus provided as illustrated in FIG. 32.

As illustrated in FIGS. 2, 33, 35 and 36, the equalizer 100 is secured to a center frame hangar 372 which depends from a frame 374 of a trailer (not shown). The center frame hangar 372 is generally U-shaped such that it has a base portion 376 and first and second portions 378, 380 which extend downwardly from opposite ends of the base portion 376. The base portion 376 is fixedly secured to the frame 374 of the trailer by known means, such as welding. The first extending portion 378 has an aperture 382 extending therethrough proximate to a free end 384. The second extending portion 380 has an aperture 386 extending therethrough proximate to a free end 388. The apertures 382, 386 are in alignment with one another and the free ends 384, 388 are preferably planar.

As illustrated in FIGS. 2, 33 and 35-38, the first and second base plates 104*a*, 104*b* are positioned between the first and second extending portions 378, 380 of the center frame hangar 372 such that the first surface 129*a* of the first base plate 104*a* faces the first extending portion 378, and the second surface 131*b* of the second base plate 104*b* faces the second extending portion 380. The second portion 184*a* of the first aperture 180*a* of the first base plate 104*a* is in alignment with the aperture 382 of the first extending portion 378 of the center frame hangar 372. Likewise, the second portion 184*b* of the first aperture 180*b* of the second base plate 104*b* is in alignment with the aperture 386 of the second extending portion 380 of the center frame hangar 372. A fastening member 390, which may be identical to or different from the fastening members 122*a*, 122*b*, 122*c* can be inserted through the aperture 386 of the second extending portion 380 of the center frame hangar 372, through the second portion 184*b* of the first aperture 180*b* of the second base plate 104*b*, through the aperture 320*d* of the fourth upper pivot tube 119*d*, through the second portion 184*a* of the first aperture 180*a* of the first base plate 104*a*, and through the aperture 382 of the first extending portion 378 of the center frame hangar 372. A securing member 392, which may be identical to or different from the fastening members 124*a*, 124*b*, 124*c* can then be secured to the fastening member 390 such that the equalizer 100 is rotatably secured or pivotally mounted between the first and second extending portions 378, 380 of the center frame hangar 372 by the fastening and securing members 390, 392.

It should be noted that, alternatively, the equalizer 100 can also be rotatably secured or pivotally mounted between the first and second extending portions 378, 380 of the center frame hangar 372 by the fastening and securing members 390, 392, as illustrated in FIG. 34. In FIG. 34, the first portion 182*a* of the first aperture 180*a* of the first base plate 104*a* is in alignment with the aperture 382 of the first extending portion 378 of the center frame hangar 372 and the first portion 182*b* of the first aperture 180*b* of the second base plate 104*b* is in alignment with the aperture 386 of the second extending portion 380 of the center frame hangar 372. As such, the fastening member 390 can be inserted through the aperture 386 of the second extending portion 380 of the center frame hangar 372, through the first portion 182*b* of the first aperture 180*b* of the second base plate 104*b*, through the aperture 320*c* of the third upper pivot tube 119*c*, through the first portion 182*a* of the first aperture 180*a* of the first base plate 104*a*, and through the aperture 382 of the first extending portion 378 of the center frame hangar 372. The securing member 392 can then be secured to the fastening member 390.

Thus, the configuration of the equalizer 100 allows for two different connections to the center frame hangar 372 of the frame 374 of the trailer depending on the desired position of the equalizer 100 relative to the frame 374 of the trailer.

As illustrated in FIG. 2, the suspension system 102 includes the equalizer 100, a front leaf spring 394, a rear leaf spring 396, a front shackle or link 398 and a rear shackle or link 400. As discussed above, the equalizer 100 is rotatably secured or pivotally mounted to the center frame hangar 372 of the frame 374 of the trailer, illustrated at a point J in FIG. 2. A first end 402 of the front shackle 398 is rotatably secured or pivotally mounted to the first equalizer arm assembly 366, at a point K. The first end 402 of the front shackle 398 is rotatably secured or pivotally mounted to the first equalizer arm assembly 366 by a fastening member and a securing member. The fastening member extends through apertures of the front shackle 398 and the aperture 320*a* of the first upper pivot tube 119*a*. A first end 404 of the rear shackle 400 is rotatably secured or pivotally mounted to the second equalizer arm assembly 368, at a point L. The first end 404 of the rear shackle 400 is rotatably secured or pivotally mounted to the second equalizer arm assembly 368 by a fastening member and a securing member. The fastening member extends through apertures of the rear shackle 400 and the aperture 320b of the second upper pivot tube 119b. The fastening members may be identical to or different from the fastening members 122a, 122b, 122c. The securing members may be identical to or different from the securing members 124a, 124b, 124c.

A second end 406 of the front shackle 398 is rotatably secured or pivotally mounted to a rear end 408 of the front leaf spring 394 at a point M. A front end 410 of the front leaf spring 394 is attached to a front frame hangar 411 of the frame 374 at a point N, as illustrated in FIG. 2, or can be directly attached to the frame 374 itself, depending on the configuration of the frame 374.

A second end 412 of the rear shackle 400 is rotatably secured or pivotally mounted to a front end 414 of the rear leaf spring 396 at a point P. A rear end 416 of the rear leaf spring 396 is attached to a rear frame hangar 417 of the frame 374 at a point Q, as illustrated in FIG. 2, or can be directly attached to the frame 374 itself, depending on the configuration of the frame 374.

A front axle 418 of the trailer is positioned on the forward leaf spring 394 generally equidistantly between point M and point N. A rear axle 420 is positioned on the rear leaf spring 396 generally equidistantly between point P and point Q.

It is to be understood that while only a single suspension system 102 is illustrated and described, it is typical to have one suspension system 102 provided on both a left and a right side of a trailer. If more than two axles are provided on the trailer, it is to be understood that two or more suspension systems 102 can be provided on both a left and a right side of the trailer.

Like the prior art suspension system 20 including the equalizer 22 illustrated in FIG. 1, to the extent possible, road shock and vibrations from tires (not shown) of the trailer, utilizing the suspension system 102 including the equalizer 100 of the present invention, are transferred to the front and rear axles 418, 420, and are absorbed by the front and rear leaf springs 394, 396, respectively. Points J, N and Q are the contact points through which the road shock is passed to the frame 374. The equalizer 100 is included in the suspension system 102 in order to equalize the weight on both the front and rear axles 418, 420 as the tires pass over uneven terrain. For example, an upward motion of the front leaf spring 394 results in a downward motion of the rear leaf spring 396.

Figure 37:
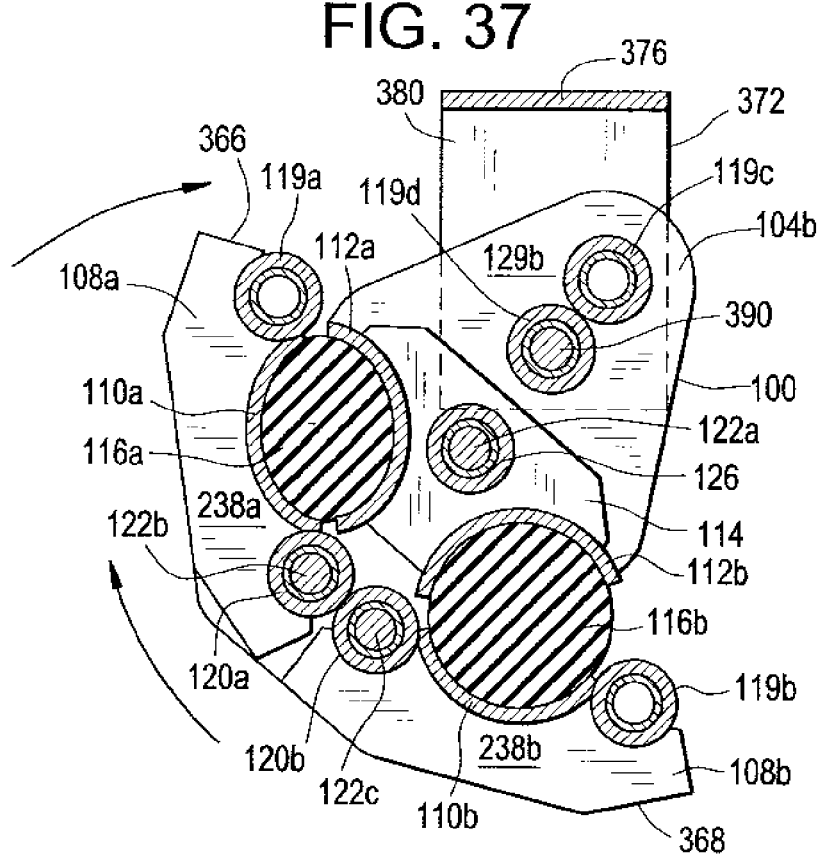
FIG. 37 is a cross-sectional view of the equalizer being rotated upwardly and to the left, relative to the position of the equalizer shown in FIG. 36, where a shock absorber is being deformed in order to absorb or dampen harsh shocks or vibrations coming off of a rear end of a front leaf spring of the suspension system.
Figure 38:
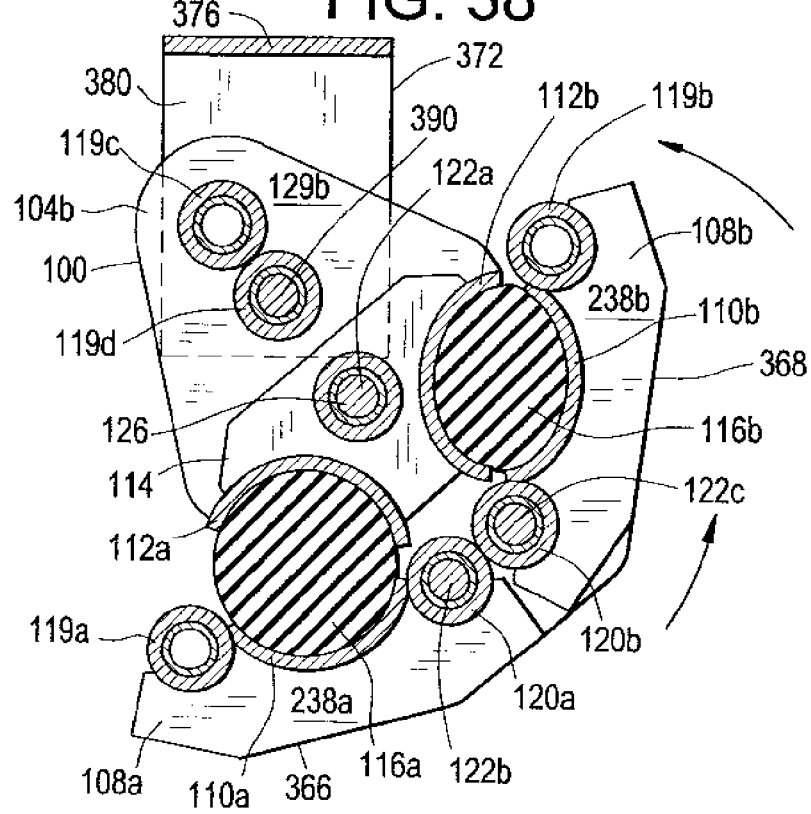
FIG. 38 is a cross-sectional view of the equalizer being rotated upwardly and to the right, relative to the position of the equalizer shown in FIG. 36, where a shock absorber is being deformed in order to absorb or dampen harsh shocks or vibrations coming off of a front end of a rear leaf spring of the suspension system.

As illustrated in FIGS. 37 and 38, the equalizer 100, unlike the equalizer 22 of the prior art, is configured to dampen or absorb the harsh shocks or vibrations coming off the rear end 408 of the front leaf spring 394 and the front end 414 of the rear leaf spring 396 proximate to the center frame hangar 372, thereby allowing for a "softer" ride.

When the front leaf spring 394 moves upward, the equalizer 100 rotates upwardly and to the left relative to the center hangar 372 about point J, as illustrated in FIG. 37, such that the rear leaf spring 396 moves downward, thus equalizing the weight on both the front and rear axles 418, 420. Further, when the front leaf spring 394 moves upward, the first equalizer arm assembly 366 rotates or pivots upwardly between the first and second base plates 104a, 104b by the second fastening and securing members 122b, 124b about a point R. As the first equalizer arm assembly 366 rotates or pivots upwardly, the first lower shock plate 110a of the first equalizer arm assembly 366 is forced against a portion of the outer surface 117a of the first shock absorber 116a, thus forcing another portion of the outer surface 117a against the first upper shock plate 112a. Under this force, the first shock absorber 116a deforms between the first lower and upper shock plates 110a, 112a, such that the first ends 274a, 282a of the first lower and upper shock plates 110a, 112a move toward one another and, such that the second ends 276a, 284a of the first lower and upper shock plates 110a, 112a move toward one another. Upon deformation, the first shock absorber 116a absorbs or dampens the harsh shocks or vibrations coming off the rear end 408 of the front leaf spring 394, which would otherwise be transferred through the equalizer to the center frame hangar 372 and, thus, to the frame 374 of the trailer. Therefore, a "softer" ride is achieved by the suspension system 102 including the equalizer 100 of the present invention.

Likewise, when the rear leaf spring 396 moves upward, the equalizer 100 rotates upwardly and to the right relative to the center hangar 372 about point J, as illustrated in FIG. 38, such that the front leaf spring 394 moves downward, thus equalizing the weight on both the front and rear axles 418, 420. Further, when the rear leaf spring 396 moves upward, the second equalizer arm assembly 368 rotates or pivots upwardly between the first and second base plates 104a, 104b by the third fastening and securing members 122c, 124c about a point S. As the second equalizer arm assembly 368 rotates or pivots upwardly, the second lower shock plate 110b of the second equalizer arm assembly 368 is forced against a portion of the outer surface 117b of the second shock absorber 116b, thus forcing another portion of the outer surface 117b against the second upper shock plate 112b. Under this force, the second shock absorber 116b deforms between the second lower and upper shock plates 110b, 112b, such that the first ends 274b, 282b of the second lower and upper shock plates 110b, 112b move toward one another and, such that the second ends 276b, 284b of the second lower and upper shock plates 110b, 112b move toward one another. Upon deformnation, the second shock absorber 116b absorbs or dampens the harsh shocks or vibrations coming off the front end 414 of the rear leaf spring 396, which would otherwise be transferred through the equalizer to the center frame hangar 372 and, thus, to the frame 374 of the trailer. Therefore, a "softer" ride is achieved by the suspension system 102 including the equalizer 100 of the present invention.

The equalizer 100 and the suspension system 102 which includes the equalizer 100 is advantageous and beneficial for a "softer" ride in comparison to the prior art equalizer 22 and the prior art suspension system 100 which includes the prior art equalizer 22.

While a preferred embodiment of the invention is shown and described, it is envisioned that those skilled in the art may devise various modifications without departing from the spirit and scope of the foregoing description and the appended claims.

The invention is claimed as follows:

1. An equalizer for use in a suspension system of a vehicle having a frame, said equalizer comprising:
    a first plate, said first plate being pivotally mounted to the frame of the vehicle;
    a second plate fixedly secured to said first plate;
    at least one equalizer arm pivotally mounted to said first plate, said at least one equalizer arm being operatively attached to the suspension system; and
    a shock absorber generally encapsulated between said second plate and said at least one equalizer arm, said shock absorber configured to absorb shock/vibrations transferred to said equalizer from the suspension system.

2. An equalizer as defined in claim 1, wherein said equalizer has first and second equalizer arms and first and second shock absorbers, said first shock absorber being generally encapsulated between said second plate and said first equalizer arm, said second shock absorber being generally encapsulated between said second plate and said second equalizer arm.

3. An equalizer as defined in claim 1, further including at least one shock plate attached to said second plate, said shock absorber configured to be at least partially encapsulated by said at least one shock plate.

4. An equalizer as defined in claim 1, further including a spacer member for spacing said second plate from said first plate, said spacer member being fixedly secured to said first plate and said second plate.

5. An equalizer as defined in claim 1, further including a shock plate attached to said at least one equalizer arm, said shock plate mimicking the shape of the shock absorber, said shock absorber configured to be at least partially encapsulated by said shock plate.

6. An equalizer as defined in claim 5, wherein said shock absorber is at least partially formed of a flexible rubber material.

7. An equalizer as defined in claim 1, wherein said shock absorber is at least partially formed of a flexible rubber material.

8. An equalizer as defined in claim 1, further including a third plate, said third plate being pivotally mounted to the frame of the vehicle, said second plate being fixedly secured to said third plate, said at least one equalizer arm being pivotally mounted to said third plate, said second plate and said at least one equalizer arm being at least partially positioned between said first and third plates.

9. An equalizer as defined in claim 1, wherein said first plate includes means for adjusting a height at which said first plate is pivotally mounted to the frame of the vehicle.

10. An equalizer as defined in claim 1, wherein the vehicle includes front and rear axles and wherein the suspension system includes front and rear spring members having first and second ends, the first end of the front spring member being attached to the frame of the vehicle and supporting the front axle, the rear end of the rear spring member being attached to the frame of the vehicle and supporting the rear axle, said equalizer further comprising:
  a plate assembly including said second plate, a spacer member fixedly secured to said second plate, and first and second shock plates fixedly secured to said second plate, said spacer member being fixedly secured to said first plate in order to space said second plate from said first plate;
  a first equalizer arm assembly including an equalizer arm having first and second ends, a first pivot member fixedly secured generally to said first end, a second pivot member fixedly secured generally to said second end, and a shock plate fixedly secured to said equalizer arm generally between said first and second pivot members, said second pivot member being pivotally mounted to said first base plate, said first pivot member being operatively attached to the second end of the front spring member of the suspension system;
  a second equalizer arm assembly including an equalizer arm having first and second ends, a first pivot member fixedly secured generally to said first end, a second pivot member fixedly secured generally to said second end, and a shock plate fixedly secured to said equalizer arm generally between said first and second pivot members, said second pivot member being pivotally mounted to said first base plate, said first pivot member being operatively attached to the first end of the rear spring member of the suspension system;
  a first shock absorber which is generally encapsulated between said first shock plate of said plate assembly and said shock plate of said first equalizer arm assembly, said first shock absorber configured to absorb shock/vibrations transferred to said equalizer from the front spring member; and
  a second shock absorber which is generally encapsulated between said second shock plate of said plate assembly and said shock plate of said second equalizer arm assembly, said second shock absorber configured to absorb shock/vibrations transferred to said equalizer from the rear spring member.

11. An equalizer as defined in claim 10, wherein said first and second shock absorbers are at least partially formed of a flexible rubber material.

12. An equalizer as defined in claim 10, further including a third plate, said third plate being pivotally mounted to the frame of the vehicle, said second plate being fixedly secured to said third plate, said equalizer arms of said first and second equalizer arm assemblies being pivotally mounted to said third plate, said second plate and said equalizer arms being at least partially positioned between said first and third plates.

13. An equalizer as defined in claim 10, wherein said first plate includes means for adjusting a height at which said first plate is pivotally mounted to the frame of the vehicle.

14. A suspension system for a vehicle having a frame and an axle, said suspension system comprising:
  a spring member having first and second ends, said first end being attached to the frame of the vehicle, said spring member supporting the axle; and
  an equalizer pivotally mounted to the frame of the vehicle, said equalizer including:
    a first plate, said first plate being pivotally mounted to the frame of the vehicle;
    a second plate fixedly secured to said first plate;
    at least one equalizer arm pivotally mounted to said first plate, said at least one equalizer arm being operatively attached to said second end of said spring member; and
    a shock absorber generally encapsulated between said second plate and said at least one equalizer arm, said shock absorber configured to absorb shock/vibrations transferred to said equalizer from said spring member when the axle is moved upwardly.

15. A suspension system as defined in claim 14, wherein said at least one equalizer arm is attached to said second end of said spring member by a shackle.

16. A suspension system as defined in claim 14, wherein the vehicle has a front axle and a rear axle, and wherein said suspension system has front and rear spring members, first and second equalizer arms, and first and second shock absorbers, said front spring member being operatively associated with said first equalizer arm, said first shock absorber being generally encapsulated between said second plate and said first equalizer arm, said rear spring member being operatively associated with said second equalizer arm, said second shock absorber being generally encapsulated between said second plate and said second equalizer arm.

17. A suspension system as defined in claim 14, wherein said spring member is a leaf spring.

18. A suspension system as defined in claim 14, further including at least one shock plate attached to said second plate, said shock absorber configured to be at least partially encapsulated by said at least one shock plate.

19. A suspension system as defined in claim 14, further including a spacer member for spacing said second plate from said first plate, said spacer member being fixedly secured to said first plate in order to fixedly secure said second plate to said first plate.

20. A suspension system as defined in claim 14, further including a shock plate attached to said at least one equalizer arm, said shock plate mimicking the shape of said shock absorber, said shock absorber configured to be at least partially encapsulated by said shock plate.

21. A suspension system as defined in claim 20, wherein said shock absorber is at least partially formed of a flexible rubber material.

22. A suspension system as defined in claim 14, wherein said shock absorber is at least partially formed of a flexible rubber material.

23. A suspension system as defined in claim 14, further including a third plate, said third plate being pivotally mounted to the frame of the vehicle, said second plate being fixedly secured to said third plate, said at least one equalizer arm being pivotally mounted to said third plate, said second plate and said at least one equalizer arm being at least partially positioned between said first and third plates.

24. A suspension system as defined in claim 14, wherein said first plate includes means for adjusting a height at which said first plate is pivotally mounted to the frame of the vehicle.

25. A suspension system as defined in claim 14, wherein the vehicle includes front and rear axles, said suspension system further comprising:

front and rear spring members having first and second ends, the first end of the front spring member being attached to the frame of the vehicle and supporting the front axle, the rear end of the rear spring member being attached to the frame of the vehicle and supporting the rear axle; and said equalizer further comprising:

a plate assembly including said second plate, a spacer member fixedly secured to said second plate, and first and second shock plates fixedly secured to said second plate, said spacer member being fixedly secured to said first plate in order to space said second plate from said first plate;

a first equalizer arm assembly including an equalizer arm having first and second ends, a first pivot member fixedly secured generally to said first end, a second pivot member fixedly secured generally to said second end, and a shock plate fixedly secured to said equalizer arm generally between said first and second pivot members, said second pivot member being pivotally mounted to said first base plate, said first pivot member being operatively attached to said second end of said front spring member;

a second equalizer arm assembly including an equalizer arm having first and second ends, a first pivot member fixedly secured generally to said first end, a second pivot member fixedly secured generally to said second end, and a shock plate fixedly secured to said equalizer arm generally between said first and second pivot members, said second pivot member being pivotally mounted to said first base plate, said first pivot member being operatively attached to said first end of said rear spring member;

a first shock absorber which is generally encapsulated between said first shock plate of said plate assembly and said shock plate of said first equalizer arm assembly, said first shock absorber configured to absorb shock/vibrations transferred to said equalizer from said front spring member; and a second shock absorber which is generally encapsulated between said second shock plate of said plate assembly and said shock plate of said second equalizer arm assembly, said second shock absorber configured to absorb shock/vibrations transferred to said equalizer from said rear spring member.

26. A suspension system as defined in claim 25, wherein said first and second shock absorbers are at least partially formed of a flexible rubber material.

27. A suspension system as defined in claim 25, further including a third plate, said third plate being pivotally mounted to the frame of the vehicle, said second plate being fixedly secured to said third plate, said equalizer arms of said first and second equalizer arm assemblies being pivotally mounted to said third plate, said second plate and said equalizer arms being at least partially positioned between said first and third plates.

28. A suspension system as defined in claim 25, wherein said first plate includes means for adjusting a height at which said first plate is pivotally mounted to the frame of the vehicle.

* * * * *